(12) United States Patent
Urino

(10) Patent No.: US 8,315,522 B2
(45) Date of Patent: Nov. 20, 2012

(54) WAVELENGTH ROUTING SYSTEM

(75) Inventor: Yutaka Urino, Tokyo (JP)

(73) Assignee: NEC Corporation, Tokyo (JP)

( * ) Notice: Subject to any disclaimer, the term of this patent is extended or adjusted under 35 U.S.C. 154(b) by 612 days.

(21) Appl. No.: 12/517,098

(22) PCT Filed: Nov. 30, 2007

(86) PCT No.: PCT/JP2007/073153
§ 371 (c)(1),
(2), (4) Date: Jun. 1, 2009

(87) PCT Pub. No.: WO2008/066150
PCT Pub. Date: Jun. 5, 2008

(65) Prior Publication Data
US 2010/0054741 A1    Mar. 4, 2010

(30) Foreign Application Priority Data

Nov. 30, 2006  (JP) .................................. 2006-324094

(51) Int. Cl.
*H04J 14/02* (2006.01)
(52) U.S. Cl. .......................................... 398/68; 398/82
(58) Field of Classification Search .................. 398/68, 398/82
See application file for complete search history.

(56) References Cited

U.S. PATENT DOCUMENTS

| | | | | |
|---|---|---|---|---|
| 5,870,216 A | * | 2/1999 | Brock et al. | 398/49 |
| 6,542,268 B1 | * | 4/2003 | Rotolo et al. | 398/68 |
| 2005/0084267 A1 | * | 4/2005 | Fan et al. | 398/84 |
| 2005/0265725 A1 | * | 12/2005 | Okano et al. | 398/147 |

FOREIGN PATENT DOCUMENTS

| | | |
|---|---|---|
| JP | 2713324 B | 10/1997 |
| JP | 1998260332 A | 9/1998 |
| JP | 3615464 B | 11/2004 |
| JP | 2005072802 A | 3/2005 |
| JP | 2005079659 A | 3/2005 |
| JP | 2006054648 A | 2/2006 |
| WO | 2007123157 A | 11/2007 |

OTHER PUBLICATIONS

Chun Fan, Stefan Adams, and Martin Reisslein, "The Ft-FR AWG Network: A practical Single-Hop Metro WDM Network for Efficent Uni- and Multi-casting", Mar. 2005, IEEE, vol. 23 No. 3, pp. 937-954.*

International Search Report for PCT/JP2007/073153 mailed Jan. 15, 2008.

N. Kamiyama, "A Large-Scale AWG-Based Single-Hop WDM Network Using Couplers With Collision Avoidance", Journal of Lightwave Technology. vol. 23, No. 7, Jul. 2005, p. 2194-2205.

(Continued)

*Primary Examiner* — Leslie Pascal

(57) ABSTRACT

A wavelength routing system includes a plurality of nodes (1, 2, 3, 4) and an array waveguide grating (40) having a routing property and optically connected to the plurality of nodes. Each of the nodes has a plurality of light sources (TLS) outputting lights at different wavelengths to the array waveguide grating, respectively, and a wavelength demultiplexer (125, 225, 325, 425) having a periodic property, demultiplexing a light output from the array waveguide grating, and outputting demultiplexed lights. The wavelength demultiplexer is set a channel period which is different from that of the array waveguide, and which is more than or equal to a number of output ports of the wavelength demultiplexer.

14 Claims, 32 Drawing Sheets

OTHER PUBLICATIONS

S. Kamei et al., "Scaling limitation of N×N signal interconnection in uniform-loss and cyclic-frequency arrayed-waveguide grating", Electronics Letters, vol. 36, No. 18, Aug. 31, 2000, p. 1578-1580.

K. Kato et al., "Full-mesh Network based on Cyclic-frequency Arrayed-waveguide Grating", NTT R&D, vol. 49, No. 6, Jun. 10, 2000, p. 298-308.

* cited by examiner

FIG. 4

WAVELENGTH NUMBER / MULTIPLEXER INPUT PORT NUMBER / NODE NUMBER

| 波長番号 | 合波器入力ポート番号 | | | |
|---|---|---|---|---|
| | X11 | X12 | X13 | X14 |
| ノード番号 1 | 1 6 11 16 21 26 | 2 7 12 17 22 27 | 3 8 13 18 23 28 | 4 9 14 19 24 29 |
| 2 | 1 6 11 16 21 26 | 2 7 12 17 22 27 | 3 8 13 18 23 28 | 4 9 14 19 24 29 |
| 3 | 1 6 11 16 21 26 | 2 7 12 17 22 27 | 3 8 13 18 23 28 | 4 9 14 19 24 29 |
| 4 | 1 6 11 16 21 26 | 2 7 12 17 22 27 | 3 8 13 18 23 28 | 4 9 14 19 24 29 |

FIG. 5

WAVELENGTH NUMBER / OUTPUT NODE NUMBER / AWG OUTPUT PORT NUMBER / INPUT NODE NUMBER / AWG INPUT PORT NUMBER

| 波長番号 | | | 出力ノード番号 | | | |
|---|---|---|---|---|---|---|
| | | | 1 | 2 | 3 | 4 |
| | | | AWG出力ポート番号 | | | |
| | | | 21 | 22 | 23 | 24 |
| 入力ノード番号 1 | AWG入力ポート番号 | 11 | 1 5 9 13 17 21 | 2 6 10 14 18 22 | 3 7 11 15 19 23 | 4 8 12 16 20 24 |
| 2 | | 12 | 2 6 10 14 18 22 | 3 7 11 15 19 23 | 4 8 12 16 20 24 | 1 5 9 13 17 21 |
| 3 | | 13 | 3 7 11 15 19 23 | 4 8 12 16 20 24 | 1 5 9 13 17 21 | 2 6 10 14 18 22 |
| 4 | | 14 | 4 8 12 16 20 24 | 1 5 9 13 17 21 | 2 6 10 14 18 22 | 3 7 11 15 19 23 |

FIG. 6

WAVELENGTH NUMBER / DEMULTIPLEXER OUTPUT PORT NUMBER / NODE NUMBER

| 波長番号 | 分波器出力ポート番号 | | | |
|---|---|---|---|---|
| | X21 | X22 | X23 | X24 |
| ノード番号 1 | 1 6 11 16 21 26 | 2 7 12 17 22 27 | 3 8 13 18 23 28 | 4 9 14 19 24 29 |
| 2 | 1 6 11 16 21 26 | 2 7 12 17 22 27 | 3 8 13 18 23 28 | 4 9 14 19 24 29 |
| 3 | 1 6 11 16 21 26 | 2 7 12 17 22 27 | 3 8 13 18 23 28 | 4 9 14 19 24 29 |
| 4 | 1 6 11 16 21 26 | 2 7 12 17 22 27 | 3 8 13 18 23 28 | 4 9 14 19 24 29 |

FIG. 8

| 波長番号 | 合波器入力ポート番号 | | | |
|---|---|---|---|---|
| | X11 | X12 | X13 | X14 |
| 1 | 1 6 11<br>16 21 26 | 2 7 12<br>17 22 27 | 3 8 13<br>18 23 28 | 4 9 14<br>19 24 29 |
| 2 | 1 6 11<br>16 21 26 | 2 7 12<br>17 22 27 | 3 8 13<br>18 23 28 | 4 9 14<br>19 24 29 |
| 3 | 1 6 11<br>16 21 26 | 2 7 12<br>17 22 27 | 3 8 13<br>18 23 28 | 4 9 14<br>19 24 29 |
| 4 | 1 6 11<br>16 21 26 | 2 7 12<br>17 22 27 | 3 8 13<br>18 23 28 | 4 9 14<br>19 24 29 |

- WAVELENGTH NUMBER
- MULTIPLEXER INPUT PORT NUMBER
- NODE NUMBER

| 波長番号 | | | 出力ノード番号 | | | |
|---|---|---|---|---|---|---|
| | | | 1 | 2 | 3 | 4 |
| | | | AWG出力ポート番号 | | | |
| | | | 21 | 22 | 23 | 24 |
| 1 | | 11 | 1 5 9<br>13 17 21 | 2 6 10<br>14 18 22 | 3 7 11<br>15 19 23 | 4 8 12<br>16 20 24 |
| 2 | | 12 | 2 6 10<br>14 18 22 | 3 7 11<br>15 19 23 | 4 8 12<br>16 20 24 | 1 5 9<br>13 17 21 |
| 3 | | 13 | 3 7 11<br>15 19 23 | 4 8 12<br>16 20 24 | 1 5 9<br>13 17 21 | 2 6 10<br>14 18 22 |
| 4 | | 14 | 4 8 12<br>16 20 24 | 1 5 9<br>13 17 21 | 2 6 10<br>14 18 22 | 3 7 11<br>15 19 23 |

- WAVELENGTH NUMBER
- INPUT NODE NUMBER
- AWG INPUT PORT NUMBER
- OUTPUT NODE NUMBER
- AWG OUTPUT PORT NUMBER

| 波長番号 | 分波器出力ポート番号 | | | |
|---|---|---|---|---|
| | X21 | X22 | X23 | X24 |
| 1 | 1 6 11<br>16 21 26 | 2 7 12<br>17 22 27 | 3 8 13<br>18 23 28 | 4 9 14<br>19 24 29 |
| 2 | 1 6 11<br>16 21 26 | 2 7 12<br>17 22 27 | 3 8 13<br>18 23 28 | 4 9 14<br>19 24 29 |
| 3 | 1 6 11<br>16 21 26 | 2 7 12<br>17 22 27 | 3 8 13<br>18 23 28 | 4 9 14<br>19 24 29 |
| 4 | 1 6 11<br>16 21 26 | 2 7 12<br>17 22 27 | 3 8 13<br>18 23 28 | 4 9 14<br>19 24 29 |

- WAVELENGTH NUMBER
- NODE NUMBER
- DEMULTIPLEXER OUTPUT PORT NUMBER

FIG. 16

| WAVELENGTH NUMBER 波長番号 | | MULTIPLEXER INPUT PORT NUMBER 合波器入力ポート番号 | | |
|---|---|---|---|---|
| | | X11 | X12 | X13 |
| NODE NUMBER ノード | 5 | 1 4 7<br>10 13 16 | 2 5 8<br>11 14 17 | 3 6 9<br>12 15 18 |
| | 6 | 1 4 7<br>10 13 16 | 2 5 8<br>11 14 17 | 3 6 9<br>12 15 18 |
| | 7 | 1 4 7<br>10 13 16 | 2 5 8<br>11 14 17 | 3 6 9<br>12 15 18 |
| | 8 | 1 4 7<br>10 13 16 | 2 5 8<br>11 14 17 | 3 6 9<br>12 15 18 |

FIG. 17

| WAVELENGTH NUMBER 波長番号 | | | | OUTPUT NODE NUMBER 出力ノード番号 | | | |
|---|---|---|---|---|---|---|---|
| | | | | 8 | 7 | 6 | 5 |
| | | | | AWG OUTPUT PORT NUMBER AWG出力ポート番号 | | | |
| | | | | 21 | 22 | 23 | 24 |
| INPUT NODE NUMBER 入力ノード | 5 | AWG INPUT PORT NUMBER AWG入力ポート | 11 | 1 5 9<br>13 17 21 | 2 6 10<br>14 18 22 | 3 7 11<br>15 19 23 | 4 8 12<br>16 20 24 |
| | 6 | | 12 | 2 6 10<br>14 18 22 | 3 7 11<br>15 19 23 | 4 8 12<br>16 20 24 | 1 5 9<br>13 17 21 |
| | 7 | | 13 | 3 7 11<br>15 19 23 | 4 8 12<br>16 20 24 | 1 5 9<br>13 17 21 | 2 6 10<br>14 18 22 |
| | 8 | | 14 | 4 8 12<br>16 20 24 | 1 5 9<br>13 17 21 | 2 6 10<br>14 18 22 | 3 7 11<br>15 19 23 |

FIG. 18

| WAVELENGTH NUMBER 波長番号 | | DEMULTIPLEXER OUTPUT PORT NUMBER 分波器出力ポート番号 | | |
|---|---|---|---|---|
| | | X21 | X22 | X23 |
| NODE NUMBER ノード | 5 | 1 4 7<br>10 13 16 | 2 5 8<br>11 14 17 | 3 6 9<br>12 15 18 |
| | 6 | 1 4 7<br>10 13 16 | 2 5 8<br>11 14 17 | 3 6 9<br>12 15 18 |
| | 7 | 1 4 7<br>10 13 16 | 2 5 8<br>11 14 17 | 3 6 9<br>12 15 18 |
| | 8 | 1 4 7<br>10 13 16 | 2 5 8<br>11 14 17 | 3 6 9<br>12 15 18 |

| NODE NUMBER | WAVELENGTH NUMBER 波長番号 | OUTPUT PORT NUMBER 出力ポート番号 | MULTIPLEXER INPUT PORT NUMBER 合波器入力ポート番号 | | |
|---|---|---|---|---|---|
| | | | X11 | X12 | X13 |
| | 50 | 5010 | 1 4 7 10 13 16 | 2 5 8 11 14 17 | 3 6 9 12 15 18 |
| | | 5030 | 2 5 8 11 14 17 | 3 6 9 12 15 18 | 1 4 7 10 13 16 |
| | 60 | 6010 | 1 4 7 10 13 16 | 2 5 8 11 14 17 | 3 6 9 12 15 18 |
| | | 6030 | 2 5 8 11 14 17 | 3 6 9 12 15 18 | 1 4 7 10 13 16 |
| | 70 | 7010 | 1 4 7 10 13 16 | 2 5 8 11 14 17 | 3 6 9 12 15 18 |
| | | 7030 | 2 5 8 11 14 17 | 3 6 9 12 15 18 | 1 4 7 10 13 16 |
| | 80 | 8010 | 1 4 7 10 13 16 | 2 5 8 11 14 17 | 3 6 9 12 15 18 |
| | | 8030 | 2 5 8 11 14 17 | 3 6 9 12 15 18 | 1 4 7 10 13 16 |

FIG. 27

| WAVELENGTH NUMBER 波長番号 | INPUT NODE NUMBER 入力ノード番号 | AWG INPUT PORT NUMBER AWG入力ポート番号 | OUTPUT NODE NUMBER 出力ノード番号 / AWG OUTPUT PORT NUMBER AWG出力ポート番号 | | | |
|---|---|---|---|---|---|---|
| | | | 80 / 21 | 70 / 22 | 60 / 23 | 50 / 24 |
| | 50 | 11 | 1 5 9 13 17 21 | 2 6 10 14 18 22 | 3 7 11 15 19 23 | 4 8 12 16 20 24 |
| | 60 | 12 | 2 6 10 14 18 22 | 3 7 11 15 19 23 | 4 8 12 16 20 24 | 1 5 9 13 17 21 |
| | 70 | 13 | 3 7 11 15 19 23 | 4 8 12 16 20 24 | 1 5 9 13 17 21 | 2 6 10 14 18 22 |
| | 80 | 14 | 4 8 12 16 20 24 | 1 5 9 13 17 21 | 2 6 10 14 18 22 | 3 7 11 15 19 23 |

FIG. 28

| NODE NUMBER | | WAVELENGTH NUMBER | INPUT PORT NUMBER | DEMULTIPLEXER OUTPUT PORT NUMBER | | |
|---|---|---|---|---|---|---|
| | | | | X21 | X22 | X23 |
| 50 | | 5020 | | 1 4 7 10 13 16 | 2 5 8 11 14 17 | 3 6 9 12 15 18 |
| | | 5040 | | 2 5 8 11 14 17 | 3 6 9 12 15 18 | 1 4 7 10 13 16 |
| 60 | | 6020 | | 1 4 7 10 13 16 | 2 5 8 11 14 17 | 3 6 9 12 15 18 |
| | | 6040 | | 2 5 8 11 14 17 | 3 6 9 12 15 18 | 1 4 7 10 13 16 |
| 70 | | 7020 | | 1 4 7 10 13 16 | 2 5 8 11 14 17 | 3 6 9 12 15 18 |
| | | 7040 | | 2 5 8 11 14 17 | 3 6 9 12 15 18 | 1 4 7 10 13 16 |
| 80 | | 8020 | | 1 4 7 10 13 16 | 2 5 8 11 14 17 | 3 6 9 12 15 18 |
| | | 8040 | | 2 5 8 11 14 17 | 3 6 9 12 15 18 | 1 4 7 10 13 16 |

FIG. 29

| INPUT NODE NUMBER | WAVELENGTH NUMBER | AWG INPUT PORT NUMBER | OUTPUT NODE NUMBER | | | |
|---|---|---|---|---|---|---|
| | | | 50 | 80 | 70 | 60 |
| | | | AWG OUTPUT PORT NUMBER | | | |
| | | | 71 | 72 | 73 | 74 |
| 50 | | 61 | 1 5 9 13 17 21 | 2 6 10 14 18 22 | 3 7 11 15 19 23 | 4 8 12 16 20 24 |
| 60 | | 62 | 2 6 10 14 18 22 | 3 7 11 15 19 23 | 4 8 12 16 20 24 | 1 5 9 13 17 21 |
| 70 | | 63 | 3 7 11 15 19 23 | 4 8 12 16 20 24 | 1 5 9 13 17 21 | 2 6 10 14 18 22 |
| 80 | | 64 | 4 8 12 16 20 24 | 1 5 9 13 17 21 | 2 6 10 14 18 22 | 3 7 11 15 19 23 |

|  | 21 | 22 | 23 | 24 | 25 |
|---|---|---|---|---|---|
| 11 | $\lambda 1$ | $\lambda 2$ | $\lambda 3$ | $\lambda 4$ | $\lambda 5$ |
| 12 | $\lambda 5$ | $\lambda 1$ | $\lambda 2$ | $\lambda 3$ | $\lambda 4$ |
| 13 | $\lambda 4$ | $\lambda 5$ | $\lambda 1$ | $\lambda 2$ | $\lambda 3$ |
| 14 | $\lambda 3$ | $\lambda 4$ | $\lambda 5$ | $\lambda 1$ | $\lambda 2$ |
| 15 | $\lambda 2$ | $\lambda 3$ | $\lambda 4$ | $\lambda 5$ | $\lambda 1$ |

FIG. 37

WAVELENGTH ROUTING SYSTEM

TECHNICAL FIELD

This application is the National Phase of PCT/JP2007/073153, filed Nov. 30, 2007, which claims priority to Japanese Patent Application No. 2006-324094, filed on Nov. 30, 2006, which is incorporated herein by reference in its entirety.

The present invention relates to a wavelength routing technique adapted to an optical communication network and particularly relates to a technique using a wavelength filter and a tunable wavelength light source each having a wavelength transmission property or periodic/routing property.

BACKGROUND ART

There is known, as a configuration of connecting nodes of an optical communication network, star connection using a relatively small number of optical fibers required for the connection. As a method for realizing a full-mesh connection by means of this star connection, there is known, for example, a method using an array waveguide grating described in Background Art of Patent Literature 1 described later. FIG. 35 shows a structure of the array waveguide grating described in the Patent Literature 1. FIG. 36 shows a logical connection structure of the array waveguide grating described in the Patent Literature 1. FIG. 37 shows a table of wavelength correspondence of input-output port pairs of the array waveguide grating.

As shown in FIG. 37, the array waveguide grating outputs different wavelengths input from the same input port from different output ports, respectively. Furthermore, the array waveguide grating outputs the same wavelength input from different input ports from different output ports, respectively. Accordingly, full-mesh connection among nodes can be realized by arranging multiplexers-demultiplexers or the like multiplexing and demultiplexing wavelengths λ1 to λ5 in the respective nodes.

Meanwhile, it is effective to apply, for example, wavelength multiplexing using a plurality of wavelengths so as to enlarge a transmission band. However, as shown in FIG. 37, the number of types of wavelengths used for the inter-node connection is one according to the above-stated method. Due to this, it is difficult to enlarge the transmission band among the nodes. It is also difficult to deal with a communication congestion that possibly occurs among the nodes, a communication failure and the like.

To solve this problem, the Patent Literature 1 proposes a configuration for connecting arbitrary input/output ports of the array waveguide grating as shown in FIG. 38. Further, as a method for solving similar problems, Patent Literature 2, to be described later, discloses a method for switching routes using an optical switch as disclosed in, for example. Moreover, Patent Literature 3, to be described later, discloses a network that can connect arbitrary nodes to one another by a combination of a tunable wavelength light source and an array waveguide grating.

CITATION LIST

Patent Literature

{PTL 1} Japanese Patent Application Laid-Open No. 2005-79659 (FIGS. 3, 4 and 6)
{PTL 2} Japanese Patent No. 3615464
{PTL 3} Japanese Patent No. 2713324

SUMMARY OF INVENTION

Technical Problem

However, according to the method proposed in the Patent Literature 1, if arbitrary input/output ports of the array waveguide grating are connected, the number of connectable nodes decreases. Moreover, since ports that can perform wavelength multiplexing are fixed, it is disadvantageously difficult to deal with the inter-node congestion and the communication failures. According to the method described in the Patent Literature 2, a new optical switch is necessary. The method of the Patent Literature 3 has the following problems. Full-mesh connection cannot be established and only one wavelength can be used to connect the nodes.

The present invention has been achieved in light of the above-stated problems. It is an object of the present invention to provide a wavelength routing technique efficiently using a given communication band without decreasing the number of connections among nodes.

Solution to Problem

A wavelength routing system according to the present invention includes: a plurality of nodes; and an array waveguide grating having a routing property and optically connected to the plurality of nodes, wherein each of the nodes has a plurality of light sources outputting lights at different wavelengths to the array waveguide grating, respectively; and a wavelength demultiplexer having a periodic property, demultiplexing a light output from the array waveguide grating, and outputting the demultiplexed lights, the plurality of light sources includes a tunable wavelength light source, and the wavelength demultiplexer is set a value as a channel period which is different from that of the array waveguide, and which is more than or equal to a number of output ports of the wavelength demultiplexer.

Referring to FIG. 34, definitions of the routing property, the periodic property and the channel period dealt with in the present invention will be described. In an upper graph 98 shown in FIG. 34, a wavelength transmission property 91 between a certain input/output ports of the array waveguide grating or wavelength multiplexer-demultiplexer is indicated by a solid line and a wavelength transmission property 92 between the other input/output ports is indicated by a broken line. In a lower graph 99, a wavelength transmission property 96 of an input/output port (i+1) next to an input/output port (i) corresponding to the wavelength transmission property 91 shown in the upper graph 98 is indicated by a solid line and a wavelength transmission property 97 of the other ports is indicated by a broken line.

According to FIG. 34, a difference in transmitted wavelength between adjacent ports, that is, an interval between wavelengths 93 and 94 shown in FIG. 34 is defined as a channel wavelength interval. In addition, a difference in transmitted wavelength in the same port, that is, an interval between wavelengths 93 and 95 shown in FIG. 34 is defined as a wavelength FSR (Free Spectrum Range).

"Having a periodic property" means that a wavelength FSR is an integer multiple of the channel wavelength interval. In case of FIG. 34, the wavelength FSR is a fourfold of the channel wavelength interval. The wavelength multiplexer or the wavelength demultiplexer exhibiting such a wavelength transmission property is referred to as a wavelength multiplexer or wavelength demultiplexer having a periodic property.

Furthermore, a value obtained by dividing the wavelength FSR by the channel wavelength interval is defined as channel period. In case of FIG. 34, the channel period is "4". Having a routing property means having the above-stated periodic property, and that the channel period is equal to the number of input ports and the number of output ports. That is, the array waveguide grating which has the wavelength transmission property shown in FIG. 34 and for which each of the number of input ports and the number of output ports is "4" is the array waveguide grating having a routing property.

ADVANTAGEOUS EFFECTS OF INVENTION

According to the present invention, various connection configurations such as a full-mesh connection equally allocating wavelengths to one-to-many inter-node connections or a wavelength multiplexing point-to-point connection using all wavelengths for a one-to-one connection can be realized without decreasing the number of connection nodes. Furthermore, if a wavelength of a light source of the nodes is changed, the above-stated connection configuration can be dynamically changed without using an optical switch or the like.

BRIEF DESCRIPTION OF DRAWINGS

FIG. 4 is an explanatory diagram related to transmission wavelengths of a multiplexer according to the first embodiment.

FIG. 5 is an explanatory diagram related to transmission wavelengths of a waveguide according to the first embodiment.

FIG. 6 is an explanatory diagram related to transmission wavelengths of a demultiplexer according to the first embodiment.

FIG. 8 is an explanatory diagram related to the full-mesh connection according to the first embodiment.

FIG. 16 is an explanatory diagram related to transmission wavelengths of a multiplexer according to the second embodiment.

FIG. 17 is an explanatory diagram related to transmission wavelengths of a waveguide according to the second embodiment.

FIG. 18 is an explanatory diagram related to transmission wavelengths of a demultiplexer according to the second embodiment.

FIG. 20 is an explanatory diagram related to the partial full-mesh connection according to the second embodiment.

FIG. 22 is an explanatory diagram of the point-to-point connection according to the second embodiment.

FIG. 26 is an explanatory diagram related to transmission wavelengths of a multiplexer according to the third embodiment.

FIG. 27 is an explanatory diagram related to transmission wavelengths of a normal waveguide according to the third embodiment.

FIG. 28 is an explanatory diagram related to transmission wavelengths of a demultiplexer according to the third embodiment.

FIG. 29 is an explanatory diagram related to transmission wavelengths of a preliminary waveguide according to the third embodiment.

FIG. 31 is an explanatory diagram related to the partial full-mesh connection according to the third embodiment.

FIG. 33 is an explanatory diagram related to a switching operation in the instance in which a failure occurs during the partial full-mesh connection according to the third embodiment.

FIG. 37 is an explanatory diagram related to transmission wavelengths of the array waveguide grating described in the Patent Literature 1.

REFERENCE SIGNS LIST

Figure 1:
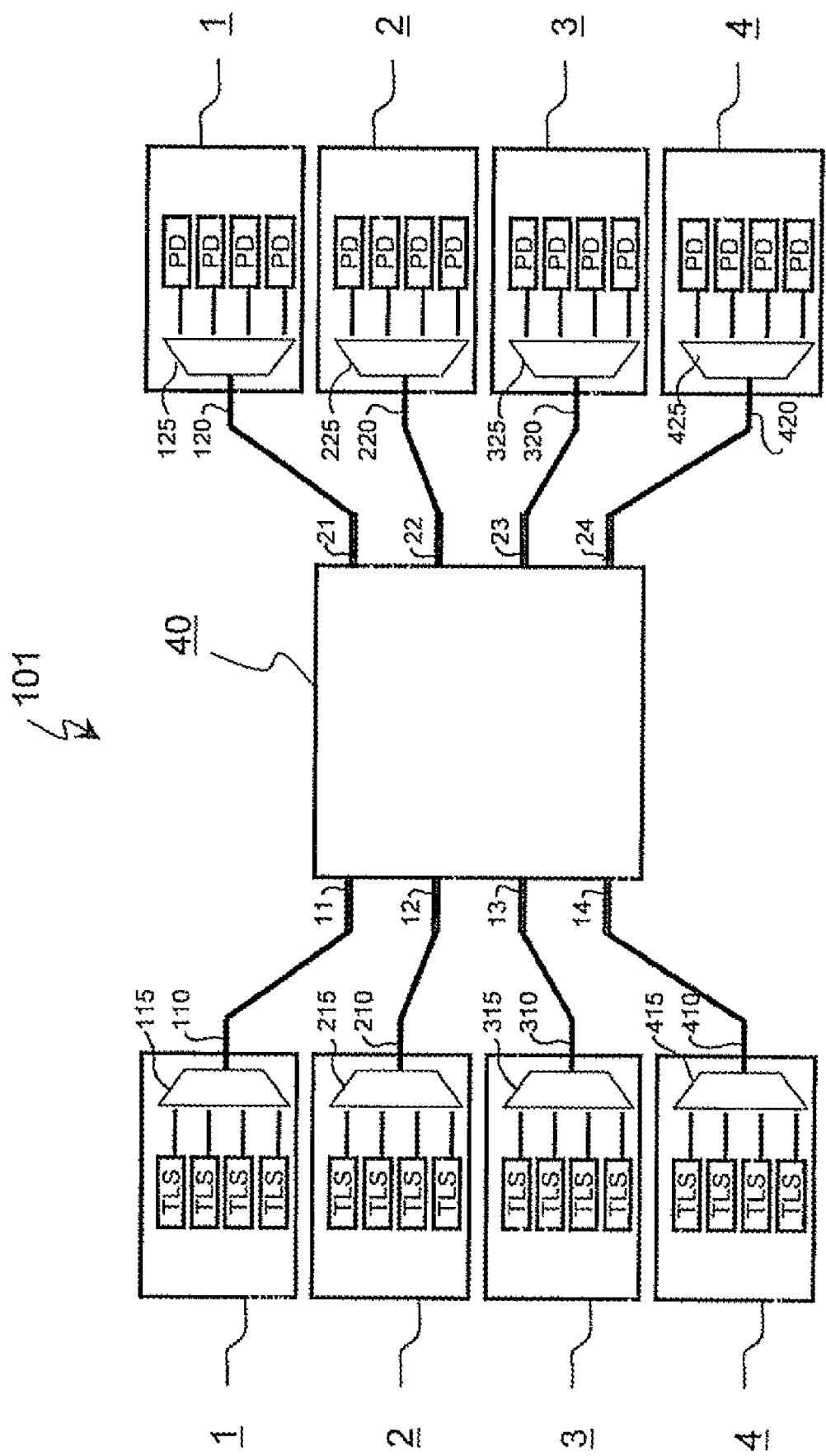
FIG. 1 is a configuration diagram of a system according to a first embodiment of the present invention.

101: System
1, 2, 3, 4: Communication node
11, 12, 13, 14: Input port of array waveguide
21, 22, 23, 24: Output port of array waveguide
40: Array waveguide grating
110, 210, 310, 410: Output port of communication node
111-114: Input port of wavelength multiplexer
115, 215, 315, 415: Wavelength multiplexer
116-119: Tunable wavelength light source
120, 220, 320, 420: Input port of communication node
121-124: Output port of wavelength demultiplexer
125, 225, 325, 425: Wavelength demultiplexer
126-129: Photodetector

DESCRIPTION OF EMBODIMENTS

First Embodiment

Embodiments of the present invention will be described with reference to the drawings in detail. FIG. 1 shows a configuration of a system according to a first embodiment of the present invention. A system 101 according to this embodiment is a system in which four nodes are connected to an array waveguide grating 40 having a routing property. Output ports 110, 210, 310 and 410 of nodes 1 to 4 are connected to input ports 11 to 14 of the array waveguide grating 40, respectively. Further, input ports 120, 220, 320 and 420 of the nodes 1 to 4 are connected to output ports 21 to 24 of the array waveguide grating 40, respectively. For convenience of description, FIG. 1 shows that each of the nodes 1 to 4 is divided into an optical transmitter (a left side) and an optical receiver (a right side). However, there is no need to divide each of the nodes 1 to 4 in an actual hardware configuration.

Figure 2:
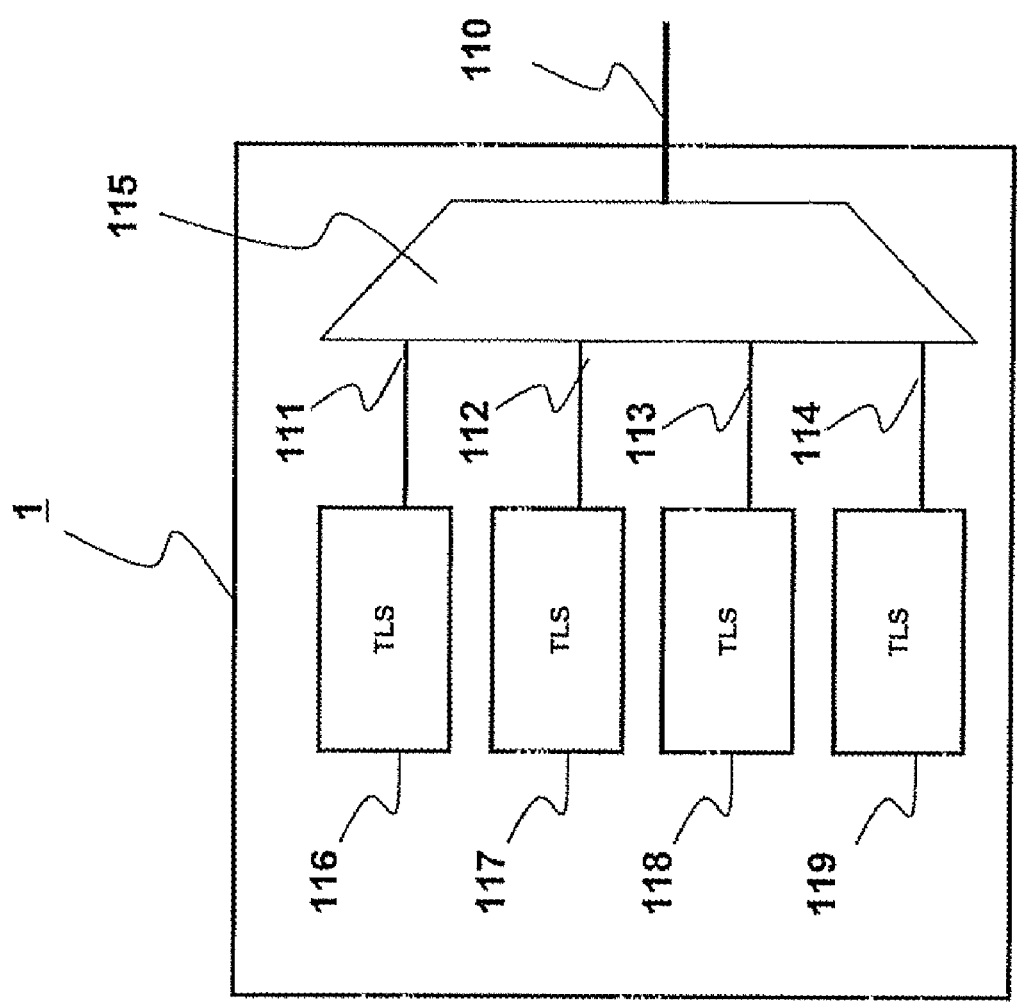
FIG. 2 is a configuration diagram of an optical transmitter of a node according to the first embodiment.

FIG. 2 shows a configuration of the optical transmitter of the node 1. The optical transmitter includes four tunable wavelength light sources 116 to 119. The tunable wavelength light sources 116 to 119 are installed so that lights output are input to input ports 111 to 114 of a wavelength multiplexer 115 having a periodic property, respectively. An output port of the wavelength multiplexer 115 is connected to the output port 110 of the node 1. The other nodes 2 to 4 are similarly configured to the node 1, and reference signs of constituent elements of the respective nodes 2 to 4 are given so as to replace upper-one-figure numbers described in the node 1 by 2 to 4 according to their node numbers, respectively. For example, four tunable wavelength light sources of the node 2 are tunable wavelength light sources 216 to 219.

Figure 3:
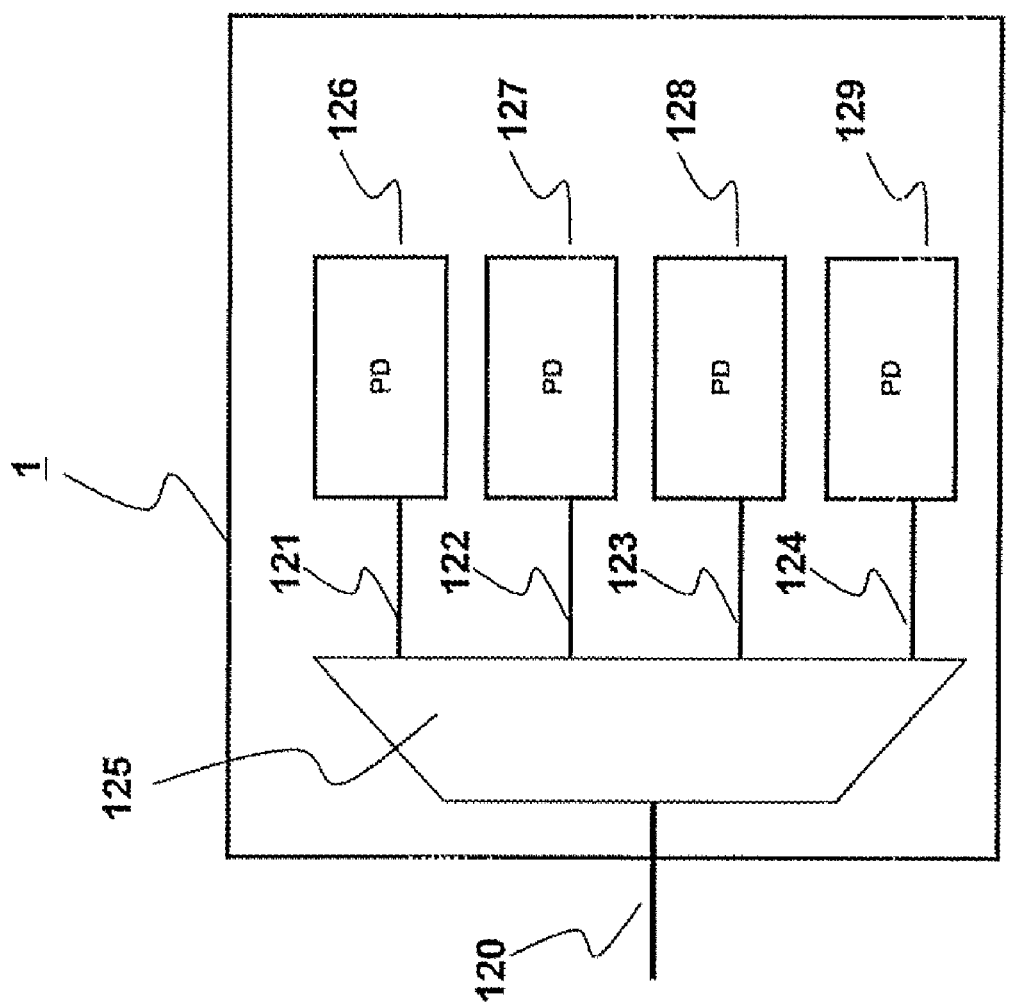
FIG. 3 is a configuration diagram of an optical receiver of the node according to the first embodiment.

FIG. 3 is a configuration diagram showing a configuration of an optical receiver included in the node 1. The optical receiver includes four photodetectors 126 to 129. The photodetectors 126 to 129 are installed so as to input outputs from output ports 121 to 124 of a wavelength demultiplexer 125 having a periodic property to the photodetectors 126 to 129, respectively. An input port of the wavelength demultiplexer 125 is connected to the input port 120 of the node 1. The other nodes 2 to 4 are configured similarly to the node 1. Numbers for identifying respective constituent elements are given so as to replace upper-one-figure signs described in the 1 node by 2 to 4 according to their node numbers, respectively. Four photodetectors of, for example, the node 3 are photodetectors 326 to 329.

If the number of nodes is "4" as described in this embodiment, each of the number of input ports and that of the output ports of the array waveguide grating 40 used for inter-node connection is equal to the number of nodes, that is, "4". Due to this, according to the definition of the routing property, a channel period of the array waveguide grating 40 having the routing property is "4".

The channel period of the array waveguide grating 40 is set to differ from a channel period of each of the wavelength multiplexers/demultiplexers 115, 215, 315, 415, 125, 225, 325 and 425. Furthermore, the both channel periods are relatively prime. In the following description, it is assumed that the channel period of the array waveguide grating 40 in the system 101 according to this embodiment is "4" as stated above and that the channel period of each of the wavelength multiplexers/demultiplexers is set to "5".

FIG. 4 shows combinations of wavelengths transmittable between input/output ports of the wavelength multiplexers 115, 215, 315 and 415 the channel period of each of which is set to "5". In a table shown in FIG. 4, horizontal rows correspond to the respective nodes 1 to 4 and vertical columns correspond to input port numbers of the wavelength multiplexers 115, 215, 315 and 415 included in the respective nodes. In relation to the input port number, "X11" represents the input port 111 for the node 1 and represents the input port 411 for the node 4, for example.

Figure 34:
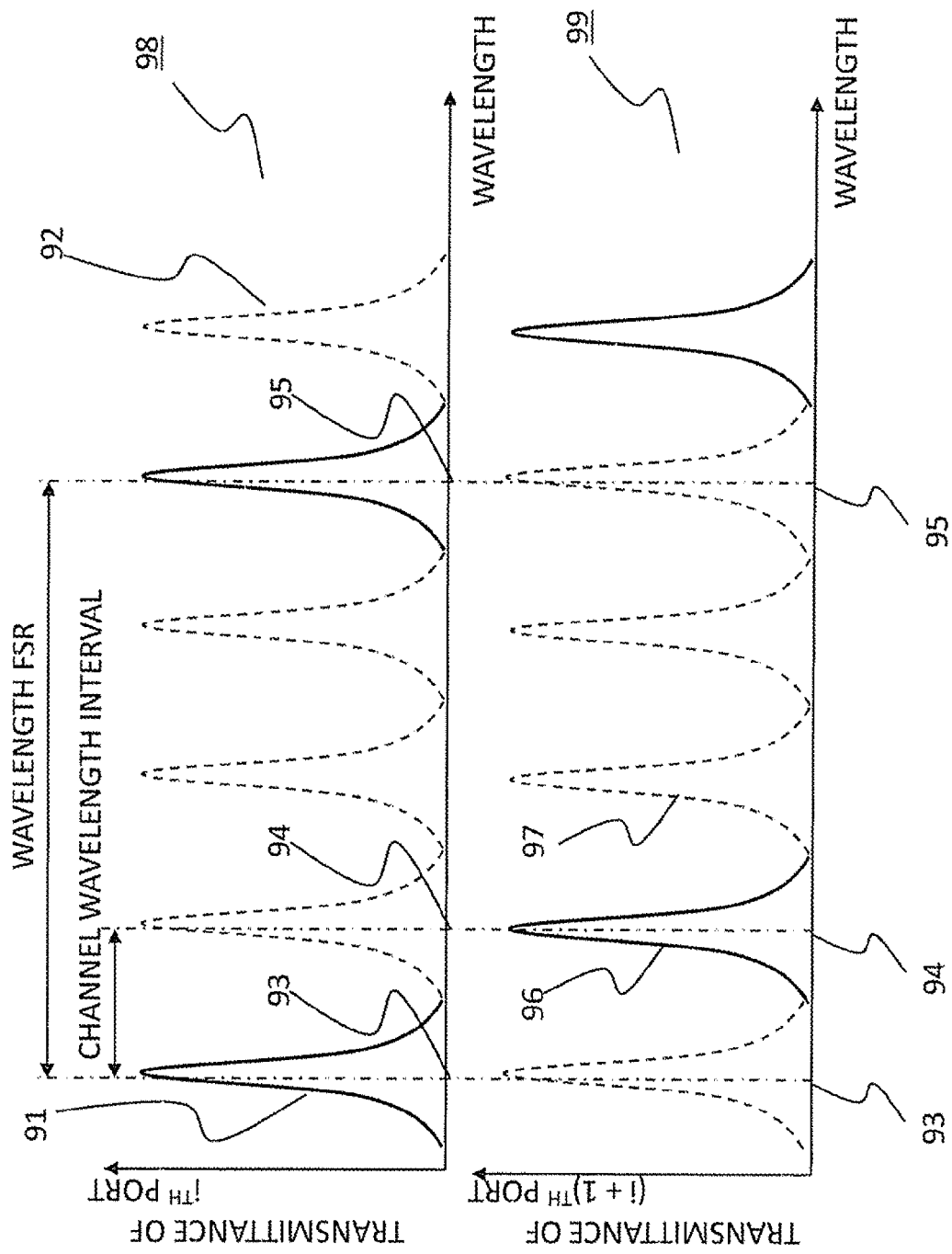
FIG. 34 is an explanatory diagram related to a wavelength transmission property of an array waveguide grating and a wavelength multiplexer/demultiplexer.
Figure 35:
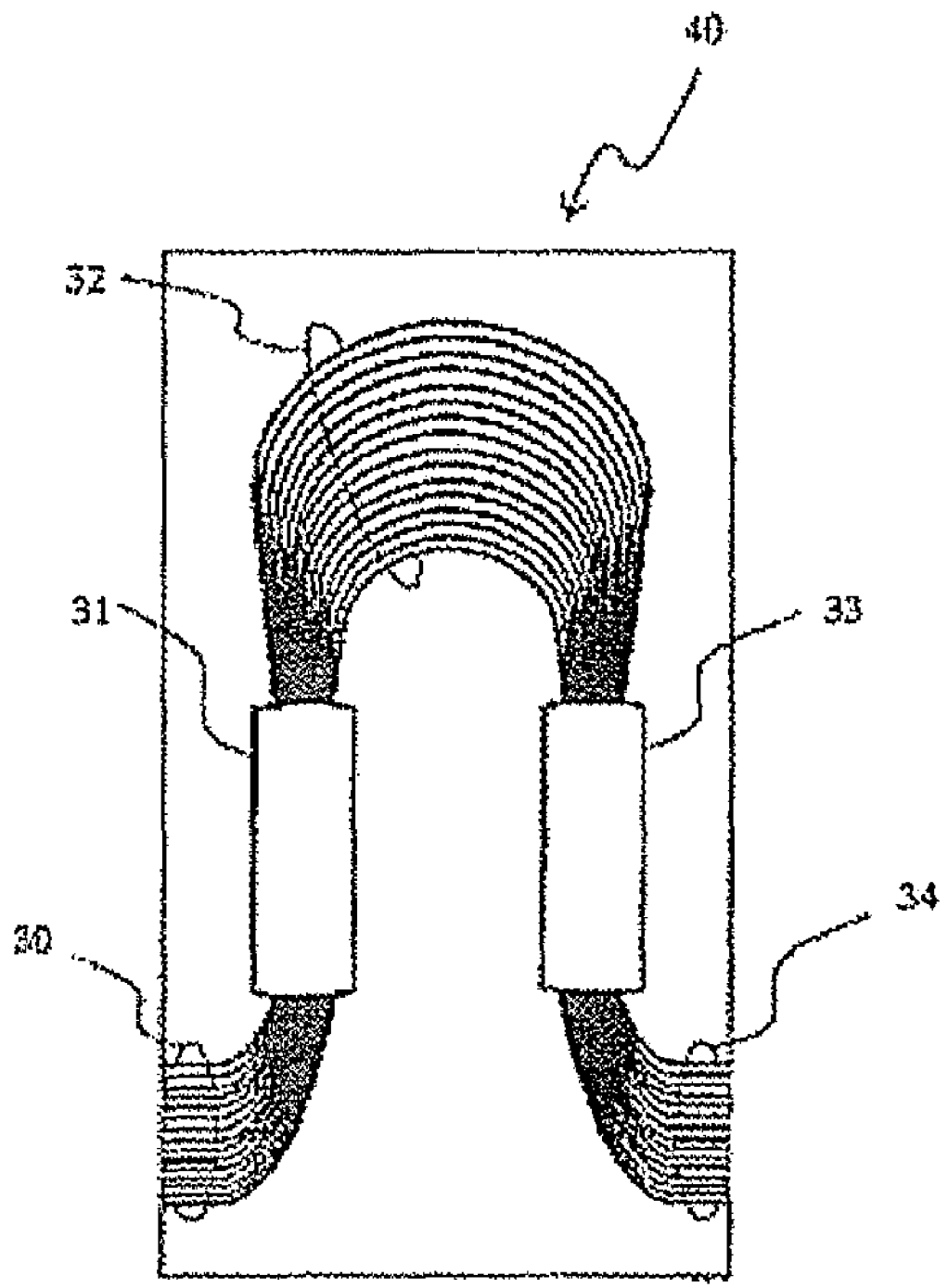
FIG. 35 is a plan view of an array waveguide grating described in the Patent Literature 1.
Figure 36:
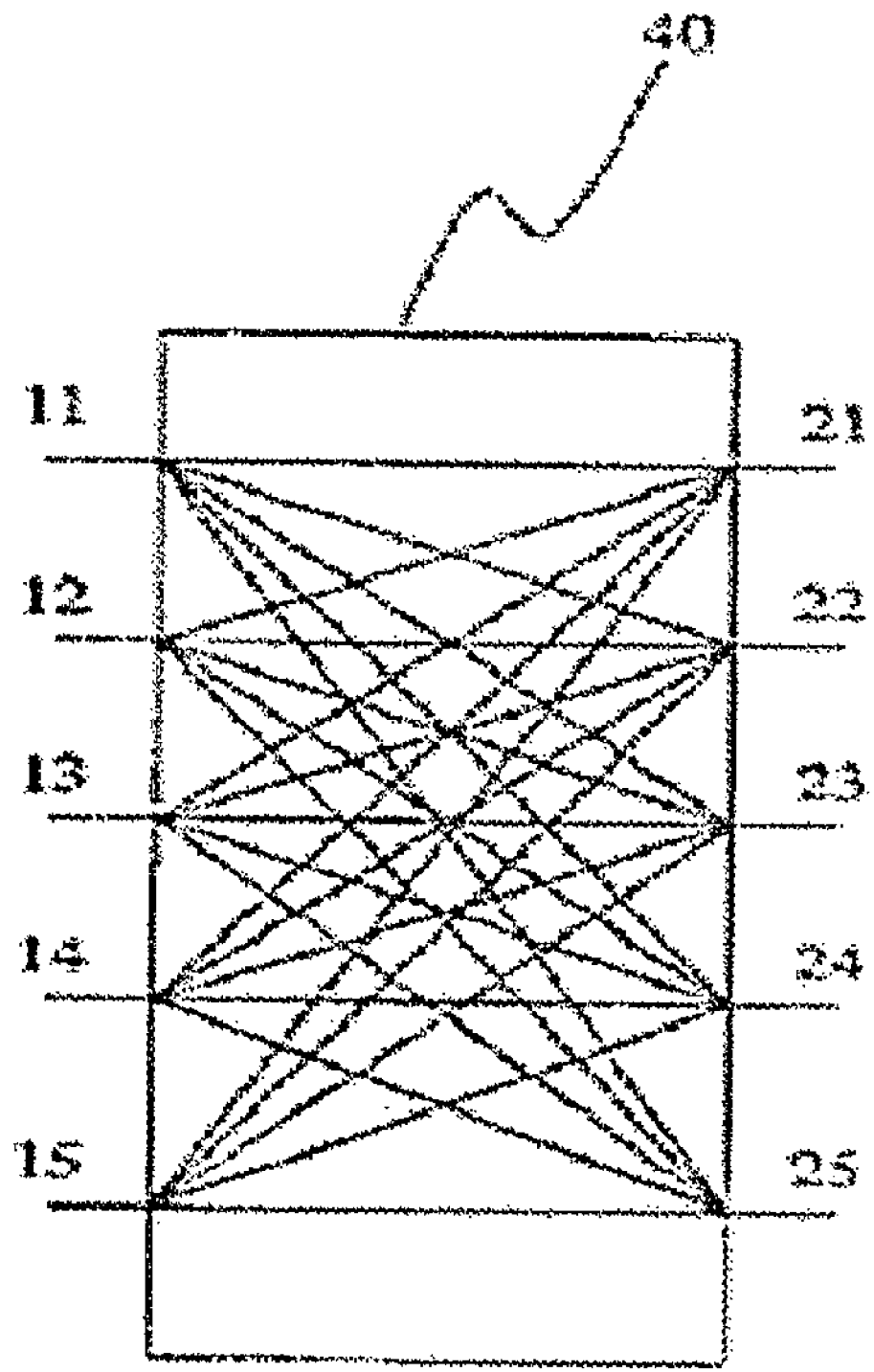
FIG. 36 is an explanatory diagram related to logical connection of the array waveguide grating described in the Patent Literature 1.
Figure 38:
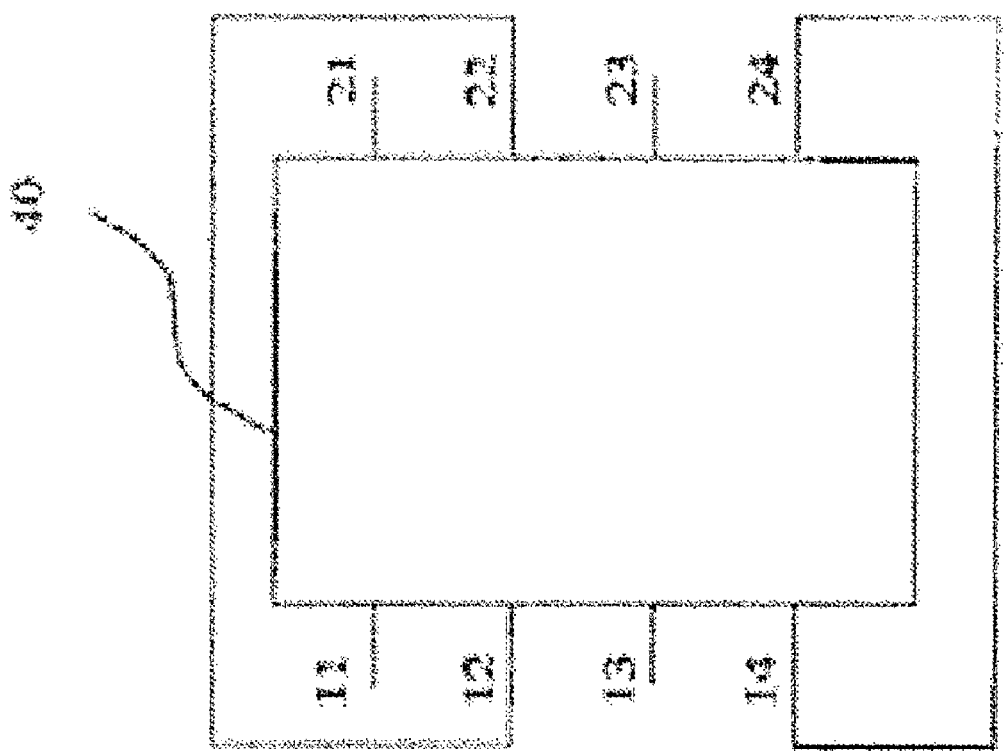
FIG. 38 is an explanatory diagram related to the array waveguide grating described in the Patent Literature 1.

Since the nodes 1 to 4 are similar in configuration, the table of FIG. 4 will be described while taking the node 1 as an example. A plurality of optical signals at a wavelength interval equal to the channel wavelength interval (FIG. 34) of the ports is given numbers "1", "2", "3", . . . in an ascending order of wavelength. When the optical signals given the wavelength numbers "1", "2", "3" and "4" are input to the input ports 111 to 114, respectively, the wavelength multiplexer 115 installed in the node 1 is set to multiplex the optical signals and to output a multiplexed signal from the output port 110.

Furthermore, since the channel period of the wavelength multiplexer 115 is "5", optical signals such as those given wavelength numbers "6, 11, 16, . . . " at the wavelength interval "5" as well as the optical signal given the wavelength number "1" are input to the input port 111, for example. The optical signal given the wavelength numbers "6, 11, 16, . . . ", similarly to the optical signal given the wavelength number "1", is multiplexed with optical signals from the other input ports (X12, X13 and X14) and is output from the output port 110. In the table of FIG. 4, this is indicated by "1, 6, 11, 16 . . . " described in cells in which rows of the node 1 cross a column "X11".

Likewise, if optical signals given wavelength numbers "2, 7, 12, . . . " are input from the input port 112, those signals are output from the output port 110. If optical signals given wavelength numbers "3, 8, 13, . . . " are input from the input port 113, those signals are output from the output port 110. If optical signals given wavelength numbers "4, 9, 14, . . . " are input from the input port 114, those signals are output from the output port 110. In the table of FIG. 4, six wavelength numbers are shown in each cell for convenience of drawing space. However, the same thing is true for wavelengths given higher wavelength numbers than those shown in FIG. 4. The same shall apply to tables described below.

FIG. 5 shows combinations of wavelengths transmittable between input/output ports of the array waveguide grating 40. In a table shown in FIG. 5, horizontal rows correspond to the respective input ports 11, 12, 13 and 14 of the array waveguide grating 40 and vertical columns correspond to the respective output ports 21, 22, 23 and 24 of the array waveguide grating 40. For example, if the multiplexed signal at wavelengths "1", "2", "3" and "4" is input to the input port 11 connected to the node 1, then a signal at the wavelength "1", a signal at the wavelength "2", a signal at the wavelength "3" and a signal at the wavelength "4" out of the multiplexed signal are output from the output ports 21, 22, 23 and 24, respectively. The output signals are input to wavelength demultiplexers of the corresponding nodes 1 to 4, respectively.

Moreover, since the channel period of the array waveguide grating 40 is "4", optical signals the respective output ports 21 to 24 deal with are those at a wavelength interval "4". For example, as shown in FIG. 5, the output port 21 outputs optical signals given such wavelength numbers as "1, 5, 9, 13 . . . ".

FIG. 6 shows combinations of wavelengths transmittable between input/output ports of the wavelength demultiplexers 125, 225, 325 and 425 the channel period of each of which is set to "5". A table shown in FIG. 6 corresponds to the table of FIG. 4 related to the wavelength multiplexers and will not be described herein.

Figure 7:
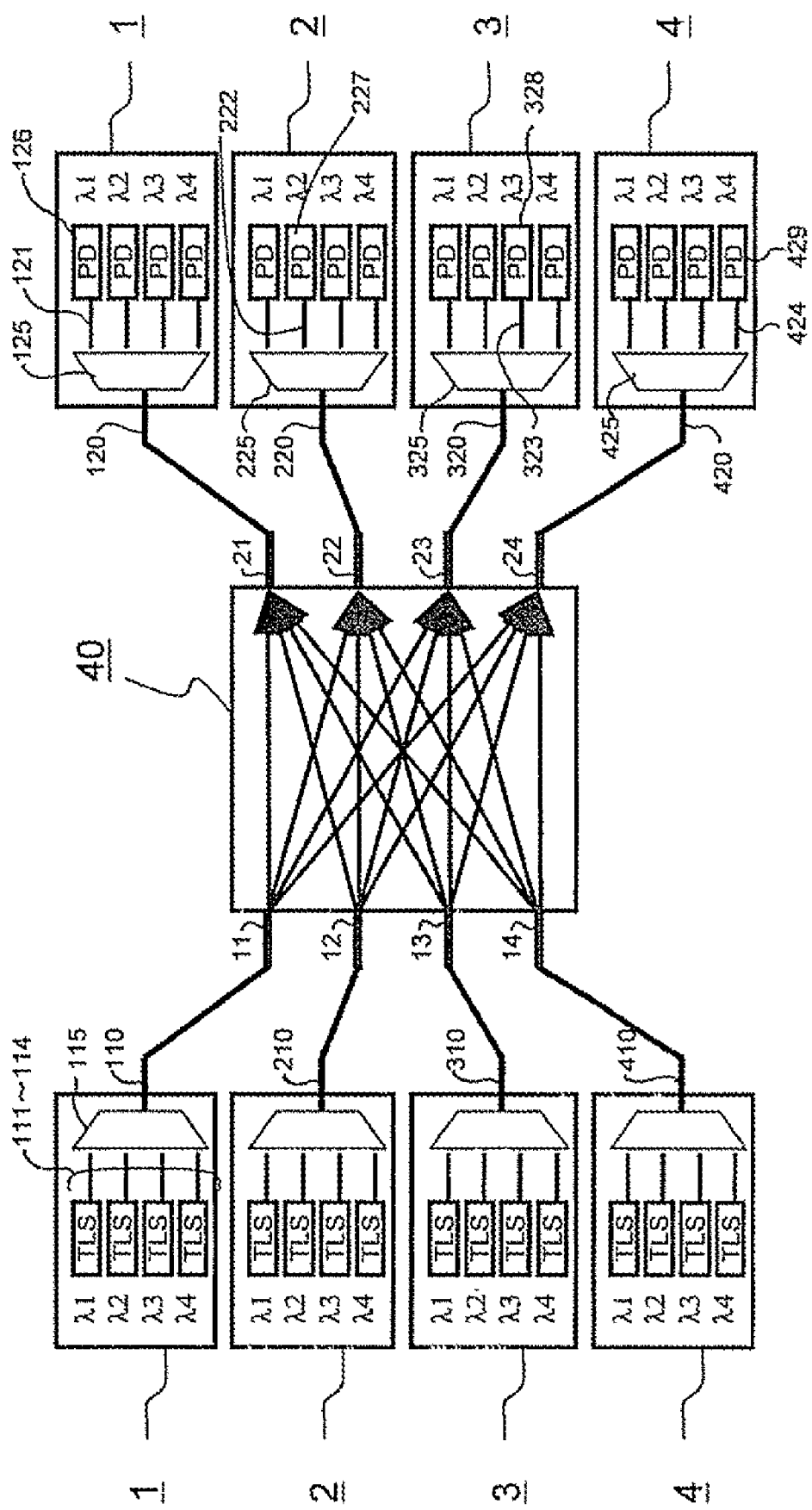
FIG. 7 is a pattern diagram of a full-mesh connection according to the first embodiment.

Operation according to this embodiment will be described. FIG. 7 typically shows operation performed if a full-mesh connection based on the tables of FIG. 4 to 6 is realized in the system 101 shown in FIG. 1. The full-mesh connection means a connection for establishing all inter-node connection including the connection between input/output ports in one node. In case of the full-mesh connection, the respective nodes perform similar operation, so that an operation for an instance in which the node 1 transmits optical signals will be described by way of example.

If oscillation wavelengths of the four tunable wavelength light sources (116 to 119) of the node 1 are set to λ1, λ2, λ3 and λ4, optical signals having four wavelengths of λ1 to λ4 are input to the four input ports 111 to 114 of the wavelength multiplexer 115, respectively. The wavelength multiplexer 115 multiplexes the input optical signals and outputs a multiplexed optical signal from the output port 111. The output multiplexed signal is input to the input port 11 of the array waveguide grating 40.

The array waveguide grating 40 outputs optical signals according to wavelengths of multiplexed signals from the four output ports 21 to 24 by a filtering function thereof. Specifically, the output port 21 outputs the optical signal at the wavelength of λ1, the output port 22 outputs the optical signal at the wavelength of λ2, the output port 23 outputs the optical signal at the wavelength of λ3 and the output port 24 outputs the optical signal at the wavelength of λ4. The output signals are input to the input ports 120, 220, 320 and 420 of the nodes 1 to 4 connected to the output ports 21 to 24 that output the optical signals, respectively.

When the optical signals are input to the wavelength demultiplexers (125, 225, 325 and 425) of the nodes 1 to 4, the nodes 1 to 4 output the optical signals to the corresponding photodetectors (126, 227, 328 and 429), respectively. Specifically, the optical signal at the wavelength of λ1 input to the wavelength demultiplexer 125 of the node 1 is input to the photodetector 126 from the output port 121. The optical signal at the wavelength of λ2 input to the wavelength demultiplexer 225 of the node 2 is input to the photodetector 226 from the output port 221. The optical signal at the wavelength of λ3 input to the wavelength demultiplexer 325 of the node 3 is input to the photodetector 326 from the output port 321. The optical signal at the wavelength of λ4 input to the wavelength demultiplexer 425 of the node 4 is input to the photodetector 426 from the output port 421.

FIG. 8 shows that the above-stated operation is mapped to the tables of FIGS. 4 to 6. In FIG. 8, the wavelength numbers of the optical signals used in the above description are outlined and paths of the optical signals are indicated by arrows. As for the other nodes 2 to 4, the wavelength numbers are also outlined. However, since the above-stated description relates to the optical signals sent from the node 1, paths are not indicated by arrows for the other nodes.

As shown in FIG. 8, the optical signals having the four wavelengths of "1", "2", "3" and "4" and transmitted from the node 1 are input to the four nodes 1 to 4 corresponding to the wavelengths via the array waveguide grating (40), respectively. Therefore, as far as combinations of all the nodes establish connection, the full-mesh connection is realized. Furthermore, since optical signals at two or more wavelengths are not input to one photodetector, crosstalk does not occur.

Figure 9:
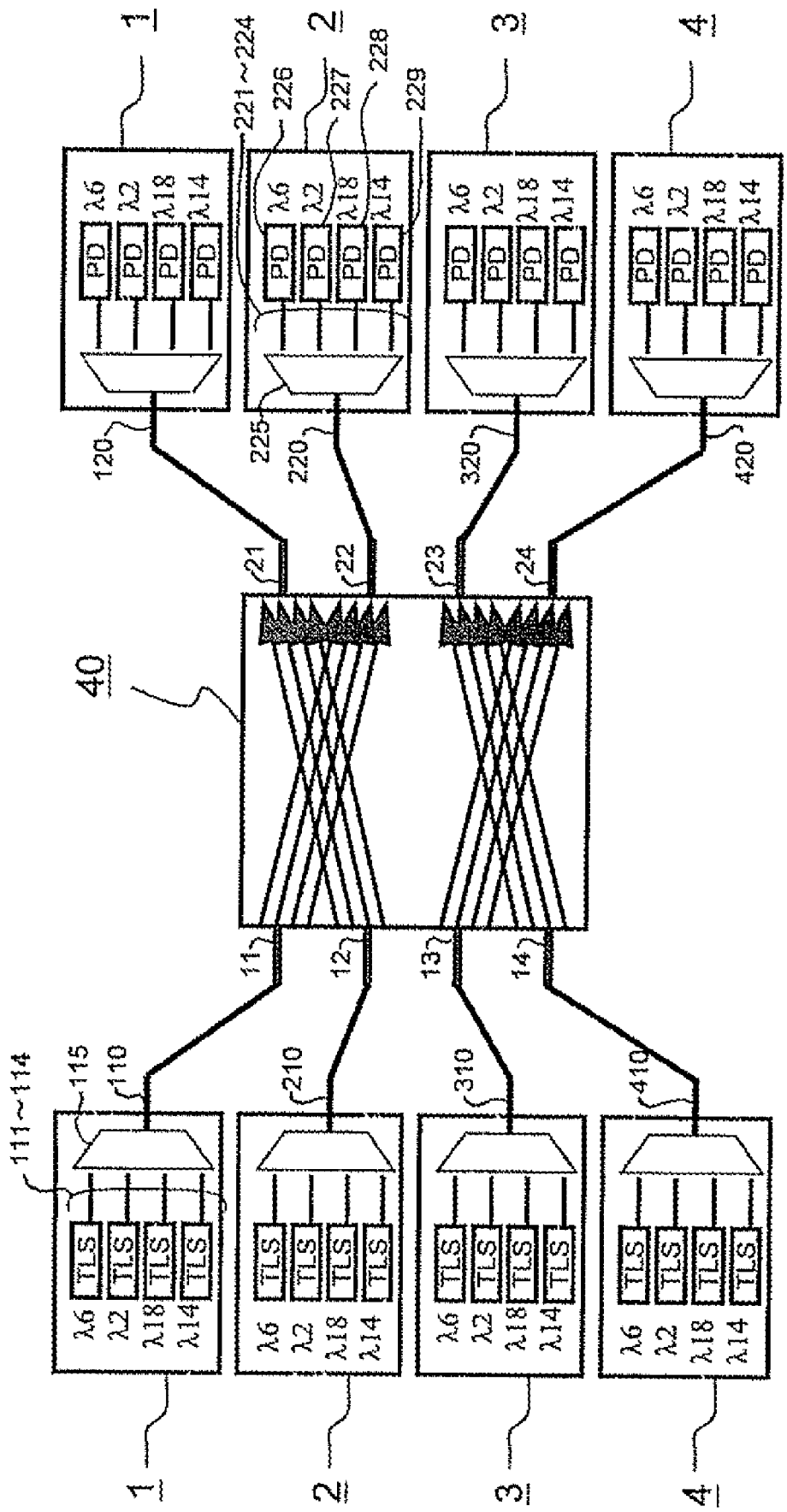
FIG. 9 is a pattern diagram of a point-to-point connection according to the first embodiment.

FIG. 9 typically shows operation if wavelength multiplex connection is realized between the nodes 1 and 2 and between the nodes 3 and 4 by point-to-point in the system 101 configured based on FIGS. 1 to 6. Since a combination of the nodes 1 and 2 is similar in operation to that of the nodes 3 and 4, the connection between the nodes 1 and 2 will be described below by way of example.

If oscillation wavelengths of the four tunable wavelength light sources (116 to 119) of the node 1 are set to λ6, λ2, λ18 and λ14, optical signals at four wavelengths of λ6, λ2, λ18 and λ14 are input to the four input ports 111 to 114 of the wavelength multiplexer 115, respectively. The wavelength multiplexer 115 multiplexes the input optical signals and outputs a multiplexed signal from the output port 110. The output signal is input to the input port 11 of the array waveguide grating 40.

The array waveguide grating 40 outputs all the input optical signals having the four wavelengths from the output port 22. The output signal is input to the input port 220 of the node 2 connected to the output port 22.

The node 2 demultiplexes the input optical signal by means of the wavelength demultiplexer 225. The optical signal at the wavelength of λ6 obtained by demultiplexing is input to the photodetector 226 from the output port 221 of the wavelength demultiplexer 225. Furthermore, the optical signal having the wavelength of λ2 is input to the photodetector 227 from the output port 222. The optical signal having the wavelength of λ18 is input to the photodetector 228 from the output port 223 and the optical signal having the wavelength of λ14 is input to the photodetector 229 from the output port 224.

Figure 10:
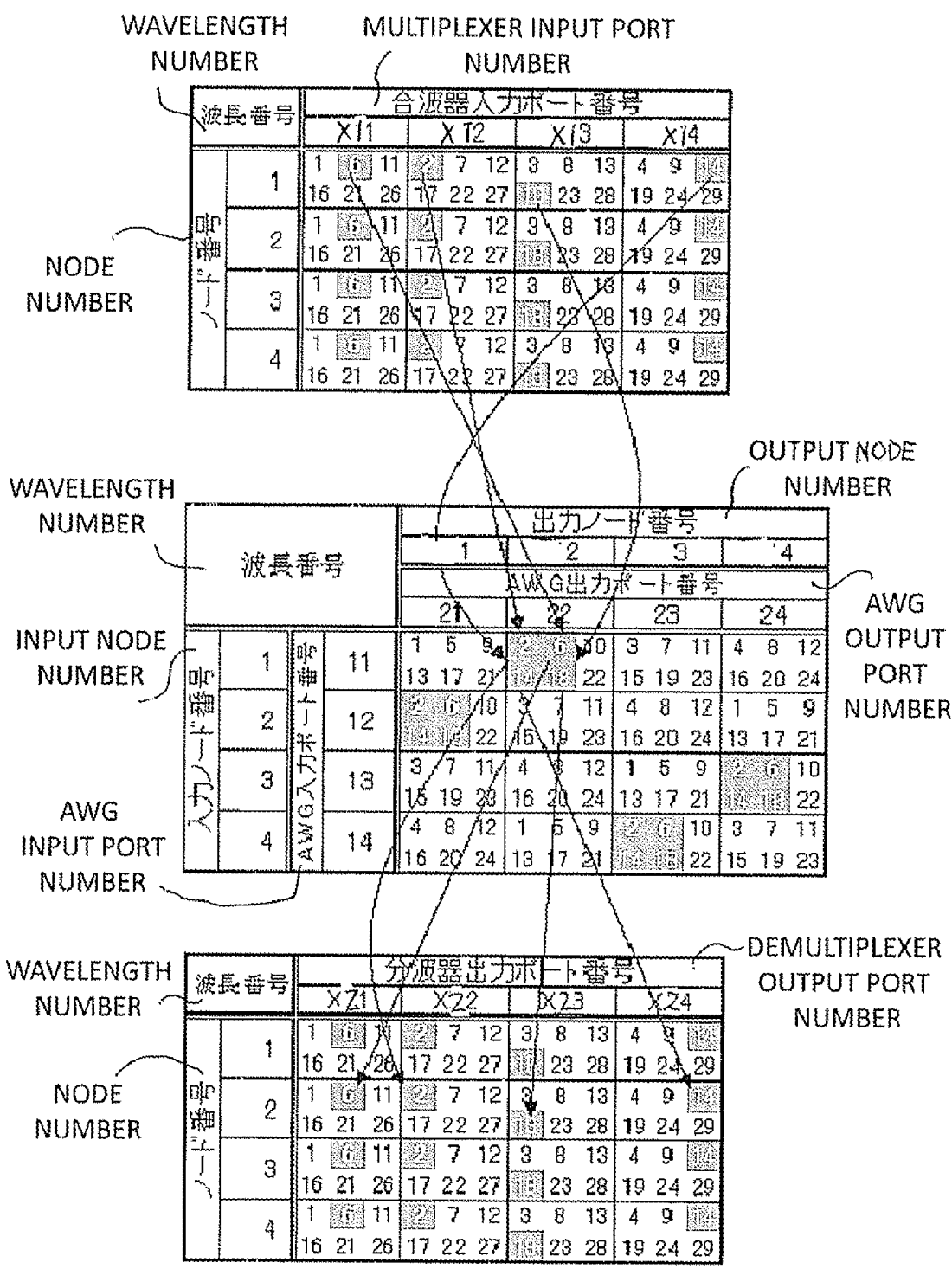
FIG. 10 is an explanatory diagram of the point-to-point connection according to the first embodiment.

FIG. 10 shows that the above-stated operation is mapped to the tables of FIGS. 4 to 6. Outlined numbers and arrows shown in FIG. 10 are similar to those shown in FIG. 8. As shown in FIG. 10, the optical signals having four wavelength of "6", "2", "18" and "14" and transmitted from the node 1 are input to the node 2 via the array waveguide grating (40). Accordingly, four-wavelength multiplex connection by point-to-point connection is realized. Furthermore, since optical signals having two or more wavelengths are not input to one photodetector, crosstalk does not occur.

An example shown in FIG. 9 shows the connection using the combination of the nodes 1 and 2 and that of the nodes 3 and 4. However, wavelength multiplex connection using an arbitrary combination such as a combination of the nodes 1 and 4 can be realized by appropriately changing settings of wavelengths of the tunable wavelength light sources.

Figure 11:
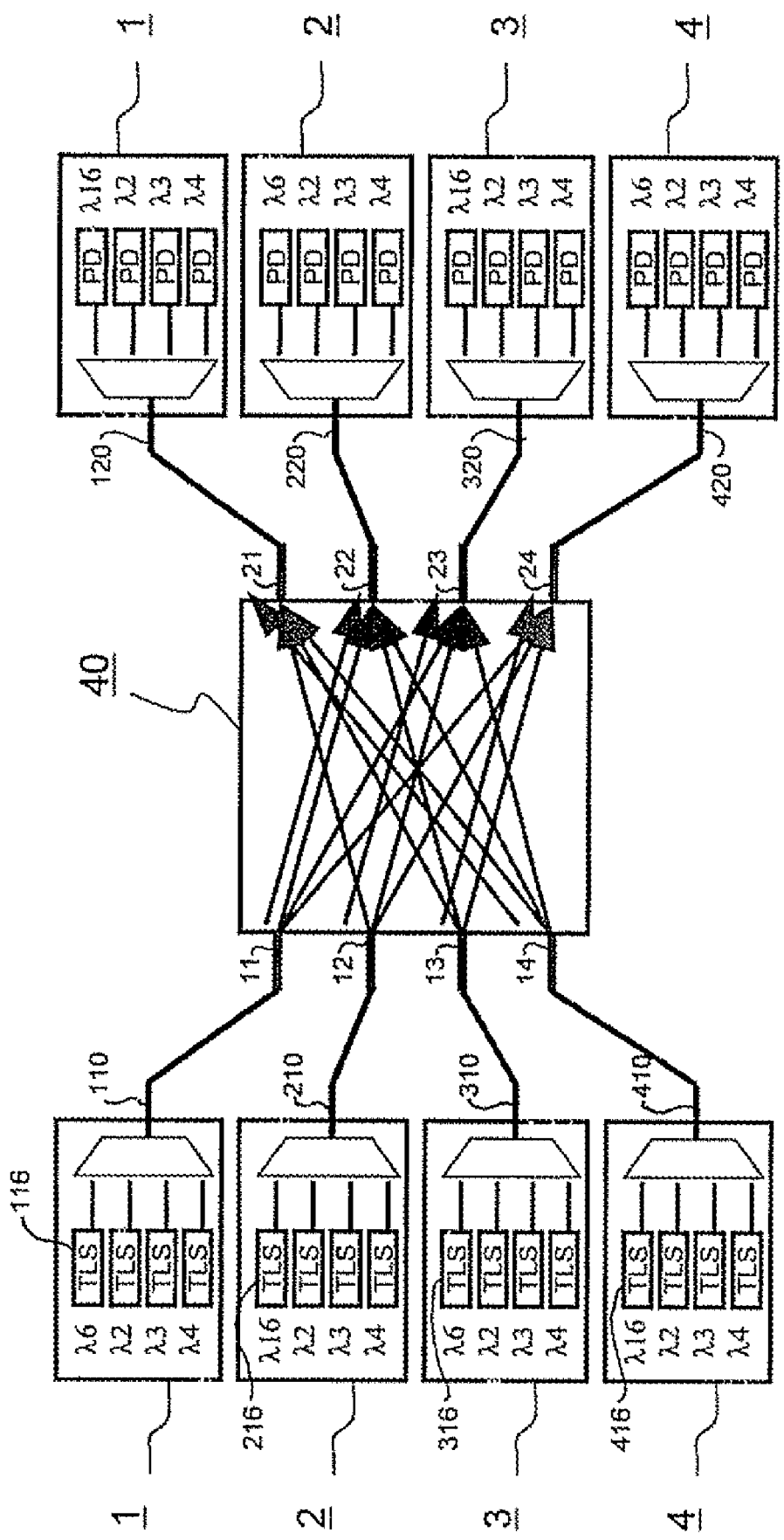
FIG. 11 is a pattern diagram of a modification of the full-mesh connection according to the first embodiment.

FIG. 11 typically shows a connection form in which connections of the same nodes out of the full mesh connection shown in FIG. 7 are changed to ring connections in a pseudo manner. In case of the complete full-mesh connection shown in FIG. 7, combinations of connections include, for example, combinations of the same nodes such as node 1 anode 1. In the form shown in FIG. 11, by contrast, four combinations for realizing pseudo ring connections, that is, node 1→node 2, node 2→node 3, node 3→node 4 and node 4→node 1 are set in place of the four combinations of the same nodes. Specifically and for example, the combination of node 1→node 1 shown in FIG. 7 is changed to the combination of node 1→node 2 in FIG. 11. In the form of FIG. 11, combinations other than those of the same nodes are the same as those by the full-mesh connection shown in FIG. 7.

To realize the connection form shown in FIG. 11, a setting of a wavelength is changed from λ1 to λ6 or λ16 for each of the tunable wavelength light sources 116, 216, 316 and 416 of the nodes 1 to 4 that oscillate the wavelength λ1 in FIG. 7. More specifically, the wavelength is set to λ6 for each of the tunable wavelength light source 116 of the node 1 and the tunable wavelength light source 316 of the node 3. Furthermore, the wavelength is set to λ16 for each of the tunable wavelength light source 216 of the node 2 and the tunable wavelength light source 416 of the node 4.

Figure 12:
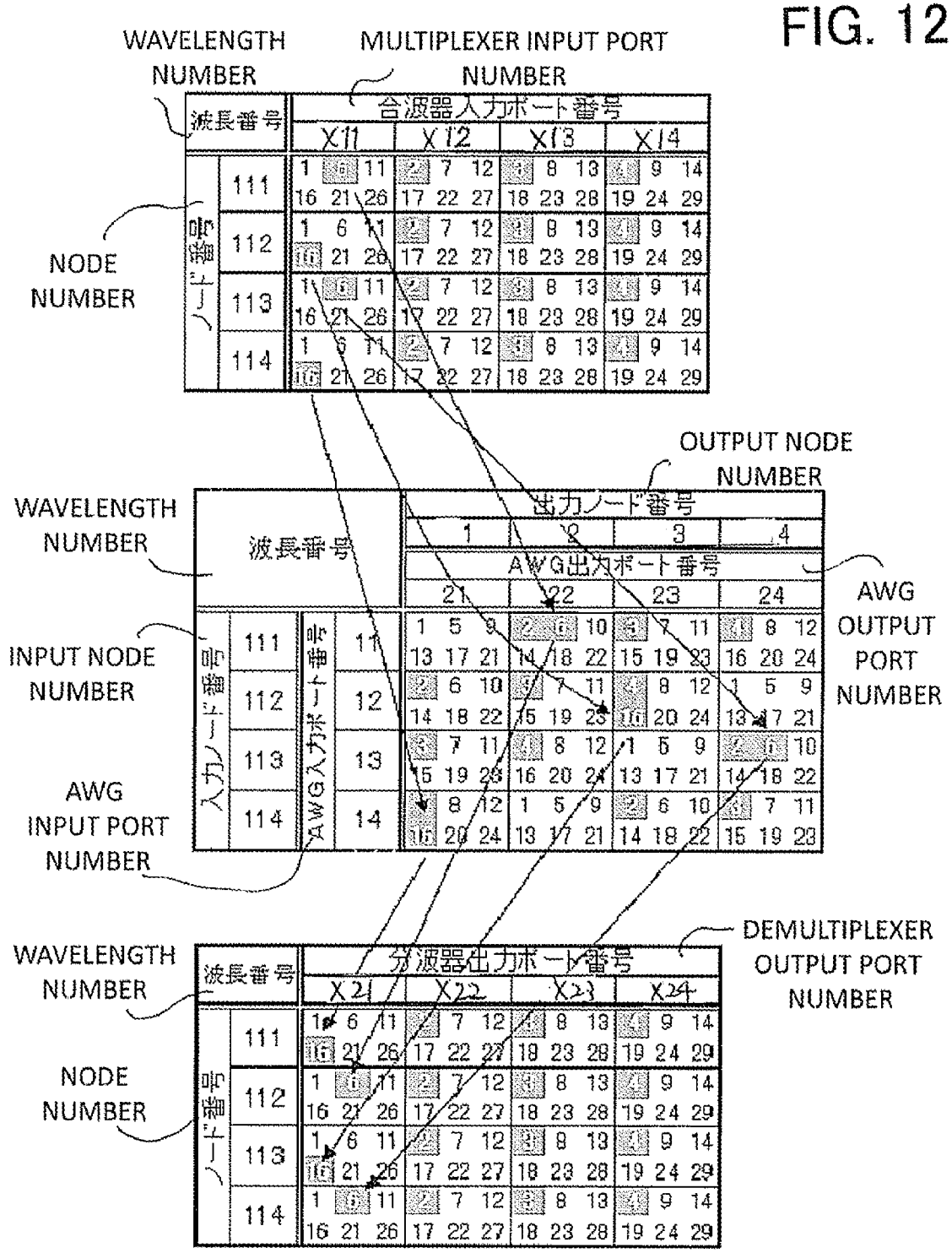
FIG. 12 is an explanatory diagram related to the modification of the full-mesh connection according to the first embodiment.

FIG. 12 shows routing operation realized by the settings of wavelengths stated above. As indicated by arrows of FIG. 12, pseudo ring connections of node 1→node 2 (λ6), node 2→node 3 (λ16), node 3→node 4 (λ6) and node 4→node 1 (λ16) are realized.

Moreover, in the above-stated example, the wavelength is set to λ6 or λ16 for the tunable wavelength light sources 116, 216, 316 and 416. Alternatively, another combination of wavelengths may be set. By doing so, various connections can be added while the combinations other than those of the same nodes maintain the full-mesh connection. Generally, the connections in the same nodes are often unnecessary. Due to this, by applying the form shown in FIG. 11, various connections can be dynamically added or connections can be dynamically changed to various connections according to changes in communication traffic.

The reason that various connections can be established by changing the oscillation wavelengths of the tunable wavelength light sources is as follows. As stated above, the channel period (N) of the array waveguide grating 40 having the routing property, the channel period (L) of each of the wavelength multiplexers having the periodic property and the channel period (K) of each of the wavelength demultiplexers having the periodic property are set to differ from one another.

The reason that various connections can be established by changing the oscillation wavelengths of the tunable wavelength light sources will be verified specifically. For example, it is understood from the cell in which the node number "1" crosses the port number "X11" in the table of FIG. 4 that the optical signals having the wavelengths "1, 6, 11 and 16" input to the input port 111 of the wavelength multiplexer 115 of the node are output from the output port 110 of the node 1. This output port 110 is connected to the input port 11 of the array waveguide grating 40.

Referring next to the row of the input port 11 in the table of FIG. 5, if signals having the wavelengths of "1, 6, 11 and 16" are input to the input port 11 of the array waveguide grating 40 from the node 1, the optical signals are output from the different output ports (21, 22, 23 and 24) of the array waveguide grating 40 according to the wavelengths, respectively. Since each of the output ports 21 to 24 are connected to any one of the input ports of nodes 1, 2, 3 and 4, the optical signals are eventually supplied from the node 1 to all the nodes including this node 1.

In this way, if the optical signals having different wavelengths are input to the same port of the array waveguide grating 40 from the same node, those signals are output from the different output ports of the array waveguide grating 40 off by one, respectively. This results from the fact that the difference between the channel period (N) of the array waveguide grating 40 and the channel period (L) of each of the wavelength multiplexer is "1". To efficiently use a communication band, therefore, it is desirable to set the difference between the N and the L to "1". In respect of this setting, L and N holds a relationship "L=N+1" in this embodiment.

Conversely, paths of the optical signals in the cell in which the node number "1" crosses the port number "X21" in the table of FIG. 6, that is, the optical signals having the wavelengths of "1, 6, 11 and 16" and output to the output port 121 of the wavelength demultiplexer 125 of the node 1 will be traced back in an opposite direction. The input port 120 of this waveguide demultiplexer 125 is connected to the output port 21 of the array waveguide grating 40. Referring to a column of this output port 21 in the table of FIG. 5, the optical signals having the wavelengths of "1, 6, 11 and 16" are input from the input ports 11, 12, 13 and 14 off by one, respectively. Since these input ports 11, 12, 13 and 14 are connected to the output ports of the nodes 1, 2, 3 and 4, the node 1 can eventually receive the optical signals from all the nodes 1 to 4.

The above-stated function results from the fact that the difference between the channel period (N) of the array waveguide grating 40 and the channel period (K) of each of the wavelength demultiplexers is "1". To efficiently use the communication band, therefore, it is desirable to set the difference between the N and the K to "1". In respect of this setting, K and N holds a relationship "K=N+1" in this embodiment.

In this embodiment, each of the number (M) of the tunable wavelength light sources and the number (M) of the photodetectors in each node is set to "4" equal to the number (N) of nodes. However, if the present invention is to be carried out, it is not always necessary to satisfy "N=M". It suffices to satisfy "M≧N" to realize the complete full-mesh connection as shown in FIG. 7. Moreover, it suffices to satisfy "M≧N−1" to realize the full-mesh connection with the other nodes as shown in FIG. 11. Furthermore, if there is no need to realize the full-mesh connection, it suffices to set the relationship of M and N to "M≦N−1".

Nevertheless, it is necessary that the channel period (K) of the wavelength demultiplexer of each node is more than or equal to the number (M) of output ports of the waveguide demultiplexer, that is, the K satisfies "K≧M". The reason is as follows. If "K≦M−1", a plurality of output ports identical in transmission wavelength is present. In this case, an optical signal having the wavelength is divided to two or more output ports or optical signals having two or more wavelengths are output from one output port, resulting in such failures as occurrence of crosstalk. It is, therefore, necessary to set the channel period (K) of the wavelength demultiplexer of each node not to satisfy "K≦M−1".

The wavelength multiplexers 115, 215, 315 and 415 and the wavelength demultiplexers 125, 225, 325 and 425 of the respective nodes can be realized by an array waveguide grating having the periodic property, a multistage asymmetric Mach-Zehnder interferometer or the like.

According to the first embodiment of the present invention, various connection forms such as the complete full-mesh connection as shown in FIG. 7, the point-to-point wavelength multiplex connection as shown in FIG. 9 and the full-mesh connection accompanied by the pseudo ring connection as shown in FIG. 11 can be realized only by switching the wavelengths of the tunable wavelength light sources without adding any optical switch or the like.

Second Embodiment

Figure 13:
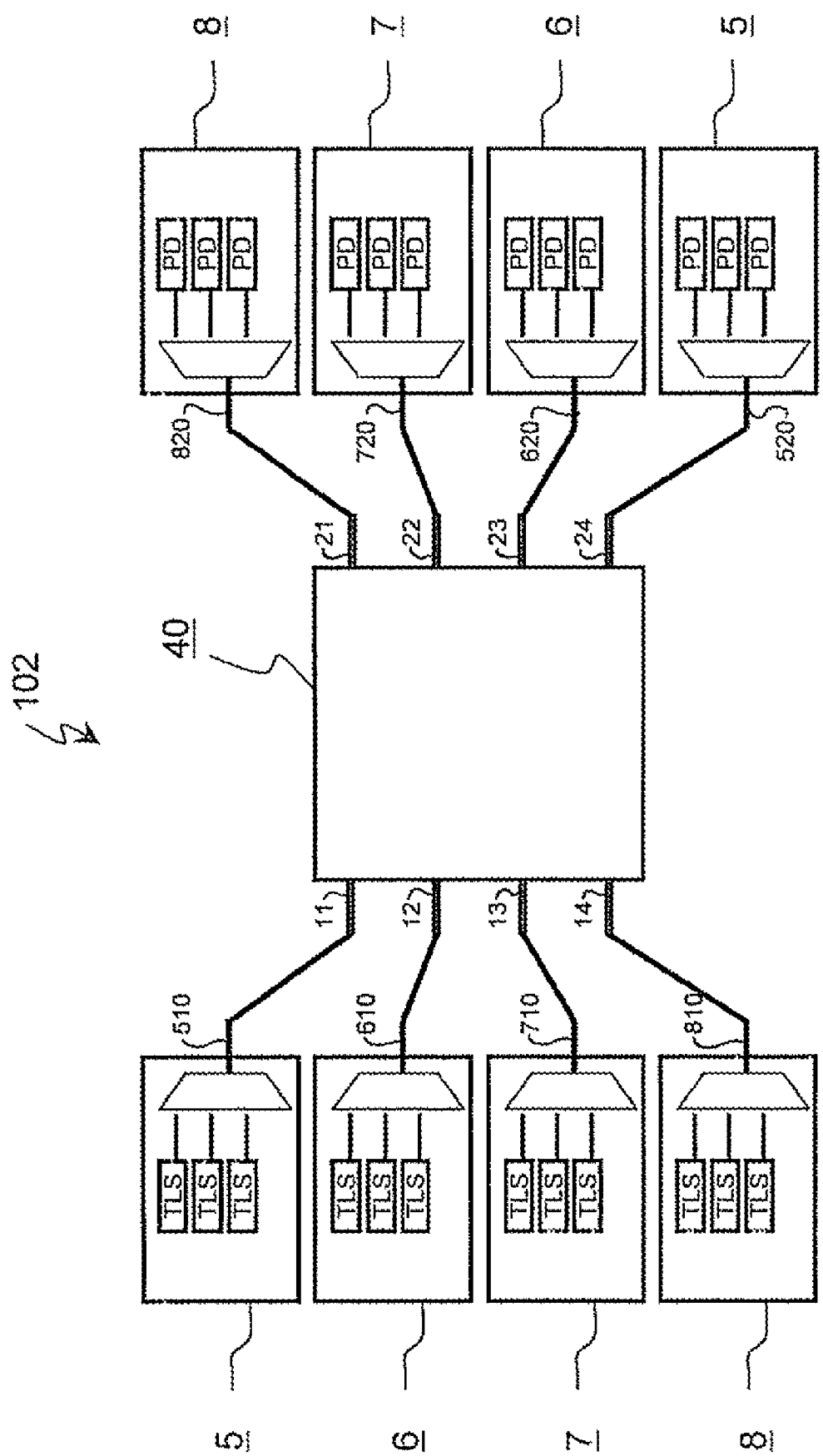
FIG. 13 is a configuration diagram of a system according to a second embodiment of the present invention.

FIG. 13 shows a configuration of a system according to a second embodiment of the present invention. While each of the number of tunable wavelength light sources (TLS) and that of the photodetectors (PD) provided in each node is "4" in the system 101 shown in FIG. 1, each of the numbers is "3" in a system 102 according to this embodiment.

In the system 102, output ports 510, 610, 710 and 810 of four nodes 5 to 8 are connected to input ports 11 to 14 of an array waveguide grating 40, respectively. On the other hand, input ports 520, 620, 720 and 820 of the nodes 5 to 8 are connected to output ports 24, 23, 22 and 21 of the array waveguide grating 40, respectively. That is, as obvious from comparison of left and right in FIG. 13, an optical transmitter and an optical receiver of each of the nodes 5 to 8 are connected to each other in reverse.

Figure 14:
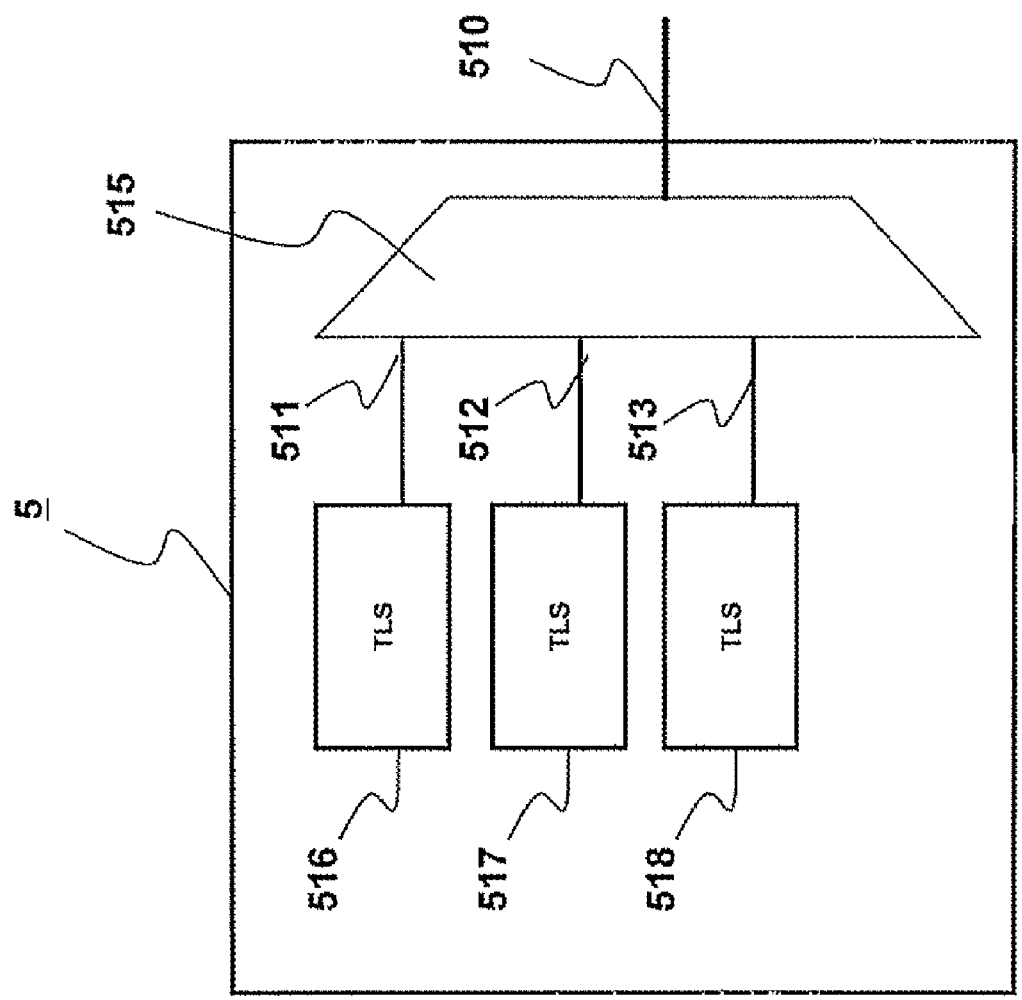
FIG. 14 is a configuration diagram of an optical transmitter of a node according to the second embodiment.

FIG. 14 shows a configuration of the optical transmitter (a left side in FIG. 13) of the node 5. In the optical transmitter, three tunable wavelength light sources 516 to 518 are installed so that lights output from the tunable wavelength light sources 516 to 518 are input to input ports 511 to 513 of a wavelength multiplexer 515, respectively. An output port of the wavelength multiplexer 515 is connected to the output port 510 of the node 5. The other nodes 6 to 8 are similarly configured to the node 5, and reference signs of constituent elements of the respective nodes 6 to 8 are given so as to replace upper-one-figure numbers described in the node 5 by 6 to 8 according to their node numbers, respectively. For example, three tunable wavelength light sources of the node 6 are tunable wavelength light sources 616 to 618.

Figure 15:
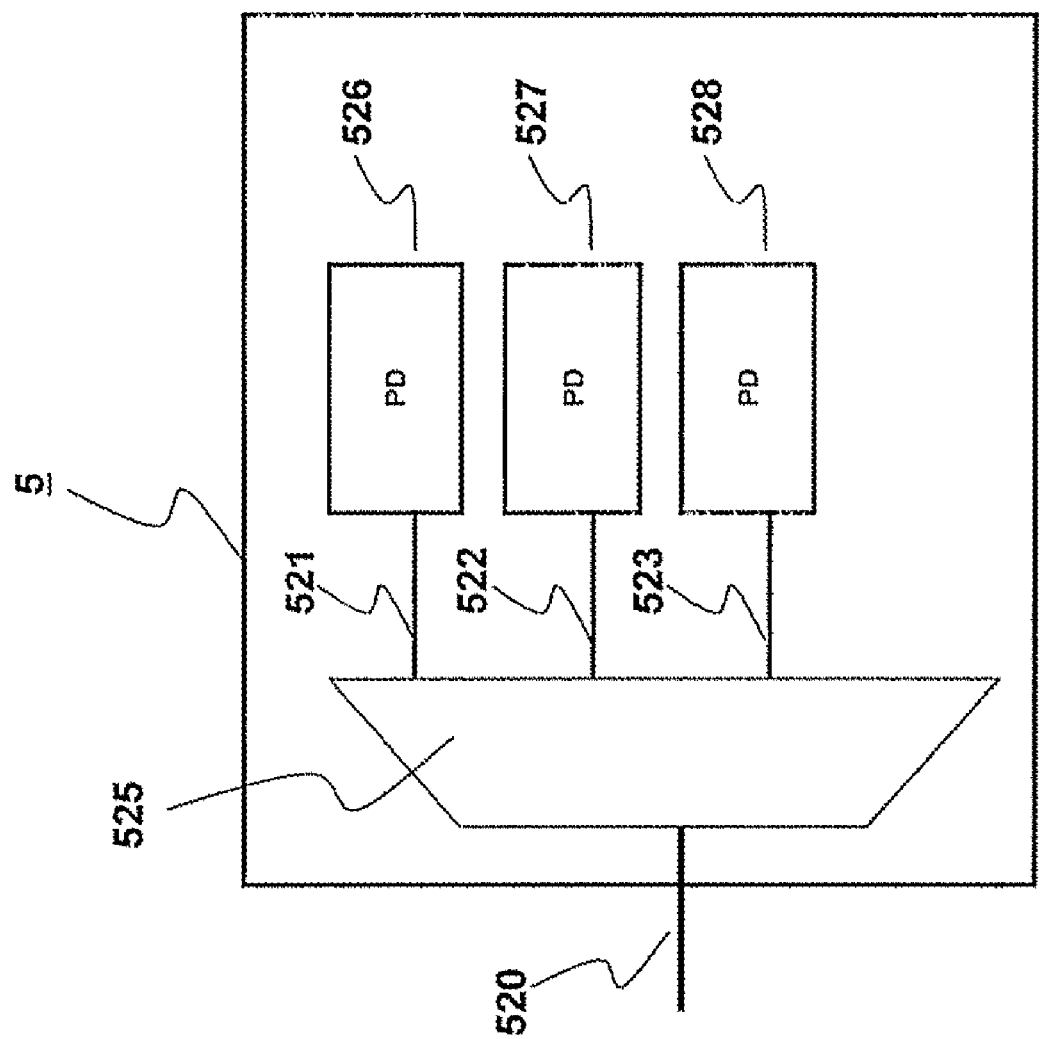
FIG. 15 is a configuration diagram of an optical receiver of the node according to the second embodiment.

FIG. 15 is a configuration diagram showing a configuration of the optical receiver (a right side in FIG. 13) of the node 5. In the optical receiver, three photodetectors 526 to 528 are arranged so as to receive outputs from output ports 521 to 523 of a wavelength demultiplexer 525, respectively. The wavelength demultiplexer 525 is connected to the input port a20 of the node 5. The other nodes 6 to 8 are configured similarly to the node 5. Numbers for identifying respective constituent elements are given so as to replace upper-one-figure signs described in the node 5 by 6 to 8 according to their node numbers, respectively. That is, three photodetectors of, for example, the node 7 are photodetectors 726 to 728.

A channel period (N) of the array waveguide grating 40 according to this embodiment is set to "4" similarly to the system 101 described above. On the other hand, a channel period (L) of each of the wavelength multiplexers 515, 615, 715 and 815 and a channel period (K) of each of the wavelength demultiplexers 525, 625, 725 and 825 are set to "3".

FIG. 16 shows combinations of wavelengths transmittable between input/output ports of the wavelength multiplexers 515, 615, 715 and 815. In a table shown in FIG. 16, horizontal rows correspond to the respective nodes 5 to 8 and vertical columns correspond to three input port of the wavelength multiplexers 515, 615, 715 and 815 included in the respective nodes. "X11", for example, represents the input port 511 for the node 5 and represents the input port 811 for the node 8. Since the nodes 5 to 8 are similar in configuration, the node 5 will be described by way of example.

The wavelength multiplexer 515 of the node 5 is set so as to multiplex optical signals having wavelengths of "1", "2" and "3" when these optical signals are input to three input ports 511 to 513, respectively, and to output the multiplexed signal from the output port 510. A channel period of this wavelength multiplexer 515 is "3". Therefore, when optical signals such as those having wavelengths of "4, 7, 10, ..." at a wavelength interval "3" as well as the optical signal having the wavelength of "1" in the same interval are input to the input port 511, the wavelength multiplexer 515 multiplexes the optical signal having the wavelengths of "4, 7, 10, ...", with optical signals from the other input ports and outputs a multiplexed signal from the output port 510. Likewise, the wavelength multiplexer 515 multiplexes optical signals input from the input port 512 and having wavelengths of "2, 5, 8, ..." and signals input from the input port 513 and having wavelengths of "3, 6, 9, ..." with signals from the other input ports and outputs the multiplexed signal from the output port 510.

FIG. 17 shows combinations of wavelengths transmittable between input/output ports of the array waveguide grating 40. Since a table shown in FIG. 17 is almost the same as that shown in FIG. 5, it will not be described in detail. However, FIG. 17 differs from FIG. 5 in a connection relationship of an output side. As shown in FIG. 17, output ports 21, 22, 23 and 24 of the array waveguide grating 40 are connected to the respective nodes in order of nodes 8, 7, 6 and 5. This is based on the connection relationship described previously along FIG. 13.

FIG. 18 shows combinations of wavelengths transmittable between input/output ports of the wavelength demultiplexers 525, 625, 725 and 825. This table corresponds to FIG. 16 and will not be described.

Figure 19:
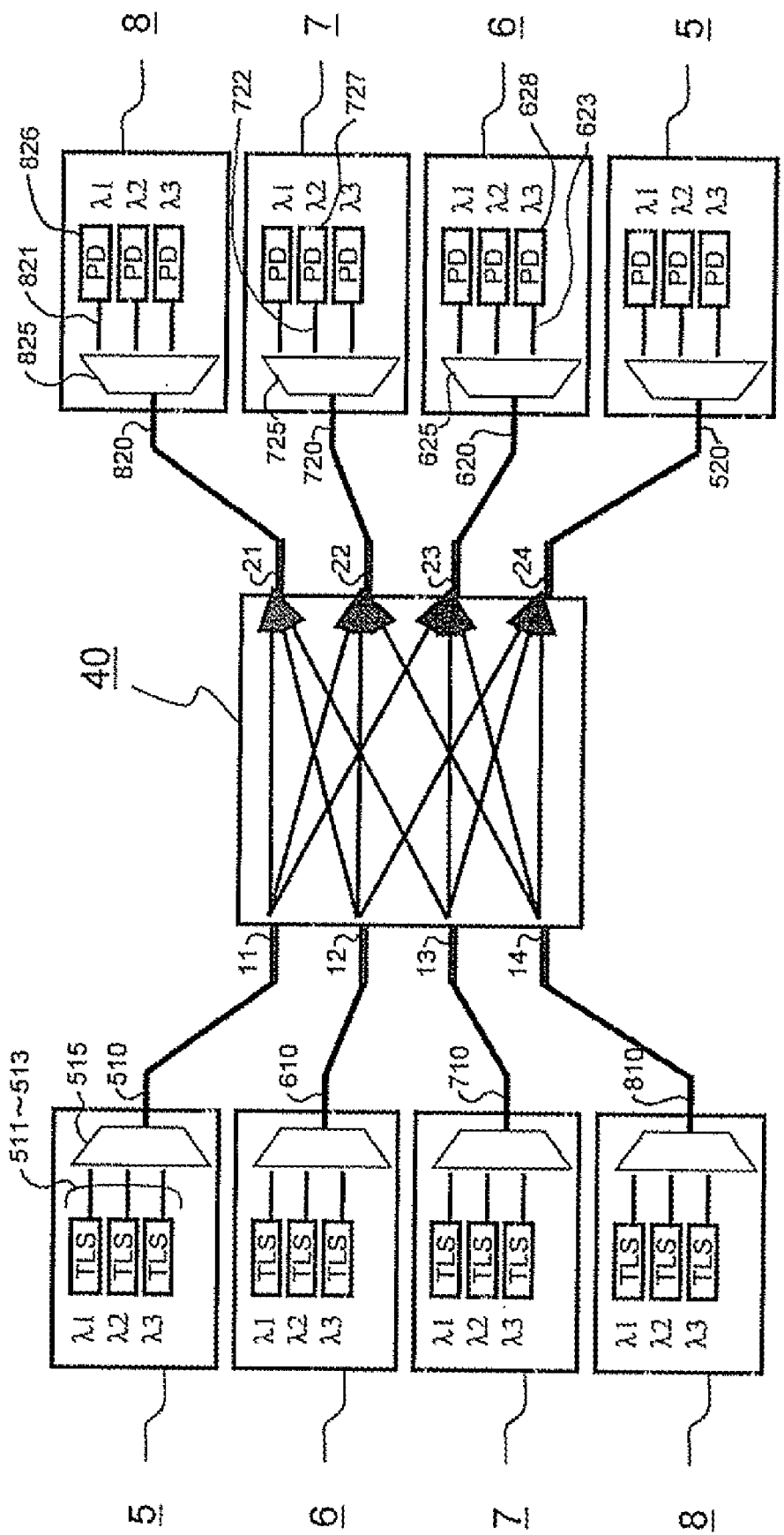
FIG. 19 is a pattern diagram of a partial full-mesh connection according to the second embodiment.

Operation according to this embodiment will be described. FIG. 19 typically shows operation performed if a partial full-mesh connection based on the tables of FIG. 16 to 18 is realized in the system 102 shown in FIG. 13. A connection form shown is such that connection between different nodes such as node 5→node 8 is established by the full-mesh connection without establishing the connection between the same nodes such as node 5→node 5. Operation relating to the node 5 will be described by way of example.

If oscillation wavelengths of the three tunable wavelength light sources (516 to 518) of the node 5 are set to λ1, λ2 and λ3, optical signals having wavelengths of λ1 to λ3 are input to the input ports 511 to 513 of the wavelength multiplexer 515, respectively. The wavelength multiplexer 515 multiplexes the input optical signals and outputs a multiplexed optical signal from the output port 511. The output multiplexed signal is input to the input port 11 of the array waveguide grating 40.

The array waveguide grating 40 outputs optical signals having wavelengths of λ1 to λ3 from the three output ports 21 to 23 according to the wavelengths of the optical signals input to the input port 11. The output signals are input to wavelength demultiplexers of the corresponding nodes, respectively. At this time, the optical signal at the wavelength of λ1 is input from the output port 21 of the array waveguide grating 40 to the wavelength demultiplexer 825 of the node 8. Further, the optical signal at the wavelength of λ2 is input from the output port 22 to the wavelength demultiplexer 725 of the node 7. The optical signal at the wavelength of λ3 is input from the output port 23 to the wavelength demultiplexer 625 of the node 6.

The wavelength demultiplexer 825 of the node 8 inputs the signal having the wavelength of λ1 to the photodetector 826 from the output port 821 of the wavelength demultiplexer 825. The wavelength demultiplexer 725 of the node 7 inputs the signal having the wavelength of λ2 to the photodetector 727 from the output port 722 of the wavelength demultiplexer 725. The wavelength demultiplexer 625 of the node 6 inputs the signal having the wavelength of λ3 to the photodetector 628 from the output port 623 of the wavelength demultiplexer 625.

Figure 20:
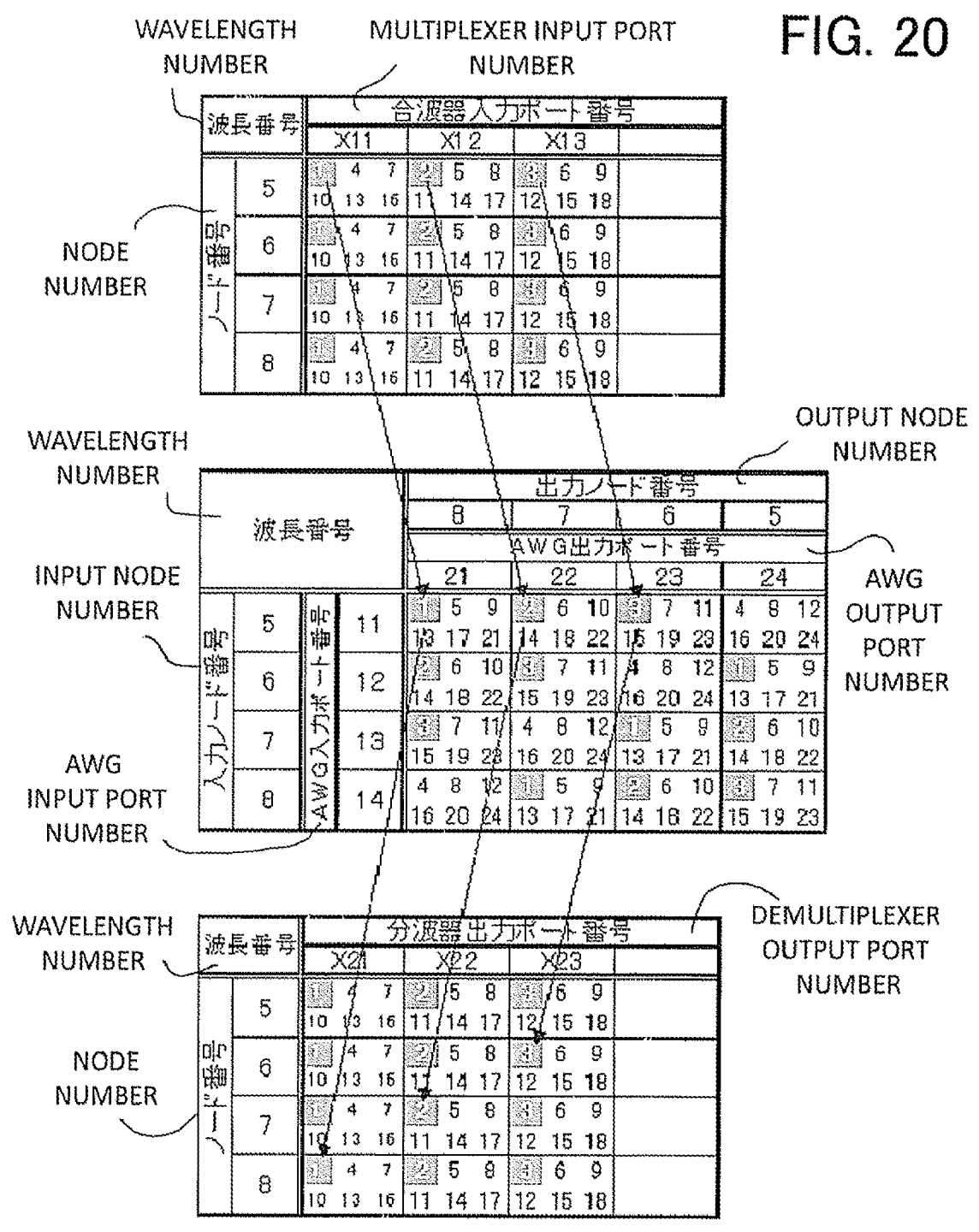

FIG. 20 shows that the above-stated operation is mapped to the tables of FIGS. 16 to 18. In FIG. 20, the wavelength numbers used in the above description are outlined and paths of the optical signals having respective wavelengths are indicated by arrows. As for the other nodes 6 to 8, the wavelength numbers are also outlined. However, paths of the optical signals having respective wavelengths are not indicated by arrows for the other nodes. As obvious from FIG. 20, optical signals having the wavelengths of "1", "2" and "3" and output from the node 5 are input to different nodes corresponding to the wavelengths, respectively. That is, connection by all combinations of different nodes is realized. Furthermore, since signals having two or more wavelengths are not input to the same photodetector, crosstalk does not occur.

Figure 21:
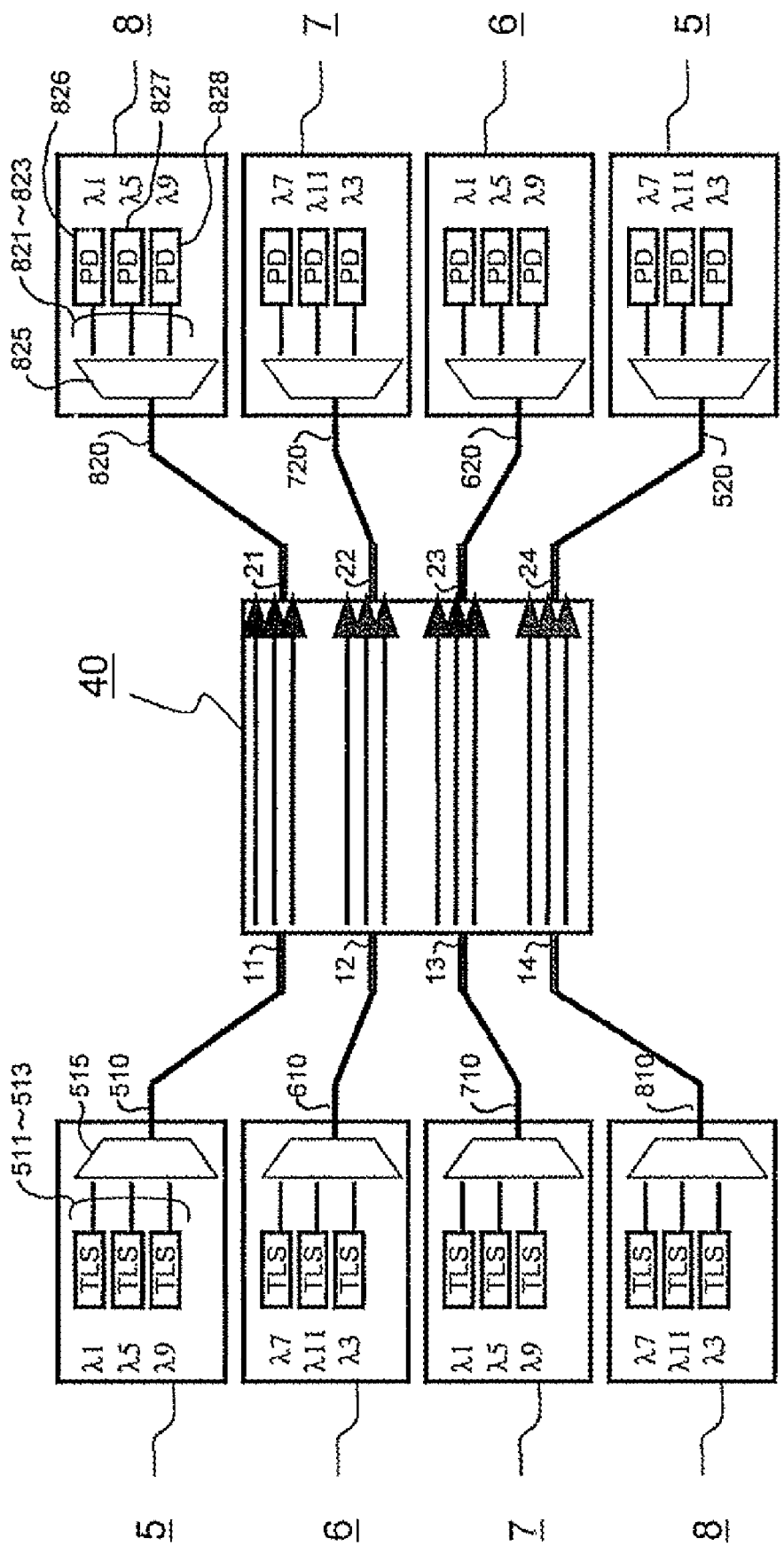
FIG. 21 is a pattern diagram of a point-to-point connection according to the second embodiment.

FIG. 21 typically shows operation if wavelength multiplex connection by point-to-point connection is realized in a configuration in FIG. 13 based on settings of FIGS. 16 to 18. An example shown in FIG. 21 is point-to-point connection between the nodes 5 and 8 and that between the nodes 6 and 7.

The operation shown in FIG. 21 will be described while referring to the node 5 by way of example. If oscillation wavelengths of the three tunable wavelength light sources (516 to 518) of the node 5 are set to λ1, λ5 and λ9, optical signals at four wavelengths of λ1, λ5 and λ9 are input to the input ports 511 to 513 of the wavelength multiplexer 515, respectively. The wavelength multiplexer 515 multiplexes the input optical signals and outputs a multiplexed signal from the output port 510. The output optical signal is input to the input port 11 of the array waveguide grating 40.

The array waveguide grating 40 outputs all the input optical signals from the output port 21. The output optical signal is input to the input port 820 of the wavelength demultiplexer 825 of the node 8 connected to this output port 21. The wavelength demultiplexer 825 demultiplexes the input optical signal and outputs demultiplexed optical signals from the output ports 821, 822 and 823, respectively. The optical signal having the wavelength of λ1 obtained by demultiplexing is input from the output port 821 to the photodetector 826. Further, the optical signal having the wavelength of λ5 is input from the output port 822 to the photodetector 827 and the optical signal having the wavelength of λ9 is input from the output port 823 to the photodetector 828.

Figure 22:
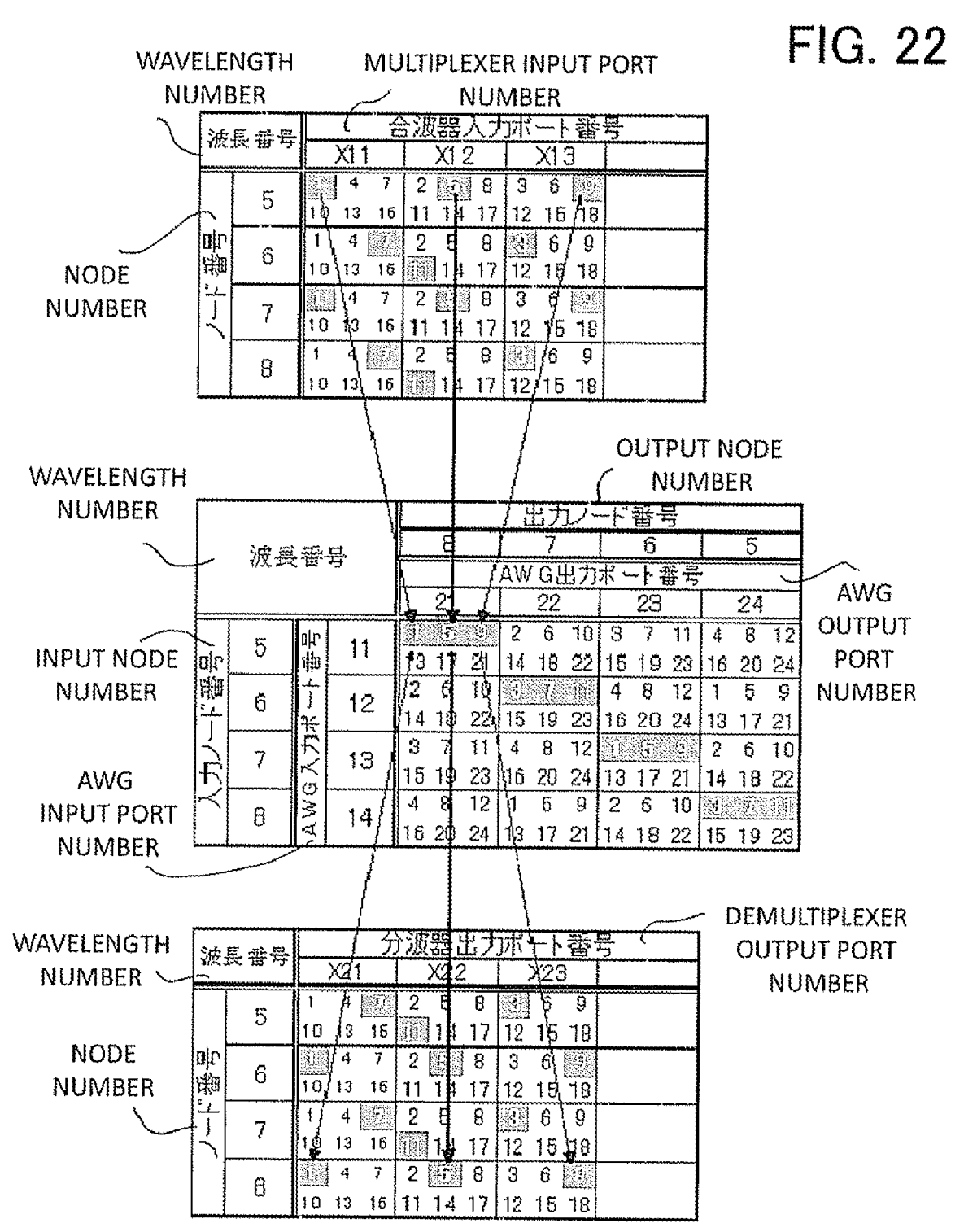

FIG. 22 shows that the above-stated operation is mapped to the tables of FIGS. 16 to 18. Outlined numbers and arrows shown in FIG. 22 are similar to those shown in FIG. 8. The optical signals output from the node 5 are all input to the node 8 via the array waveguide grating 40. Furthermore, since optical signals having two or more wavelengths are not input to one photodetector, crosstalk does not occur. Accordingly, three-wavelength multiplex communication by point-to-point connection between specific nodes is realized. The above-stated example shows the connection between the nodes 5 and 8 and that between the nodes 6 and 7. However, wavelength multiplex connection between arbitrary nodes by point-to-point can be realized by appropriately changing wavelengths of the tunable wavelength light sources.

The wavelength multiplexers 515, 615, 715 and 815 and the wavelength demultiplexers 525, 625, 725 and 825 of the respective nodes can be realized by an array waveguide grating having the periodic property, a multistage asymmetric Mach-Zehnder interferometer or the like.

According to the second embodiment described so far, the relationship between the channel period (L) of each of the wavelength multiplexers and the channel period (N) of the array waveguide grating (40) and that between the channel period (K) of each of the wavelength demultiplexers and the channel period (N) of the array waveguide grating (40) is set to "L=N−1" and "K=N−1", respectively, thereby further improving wavelength utilization efficiency. Specifically, according to the settings in this embodiment, optical signals having wavelengths of "5, 10, 15, 20 . . ." that cannot be dealt with in the preceding first embodiment can be dealt with.

Third Embodiment

Figure 23:
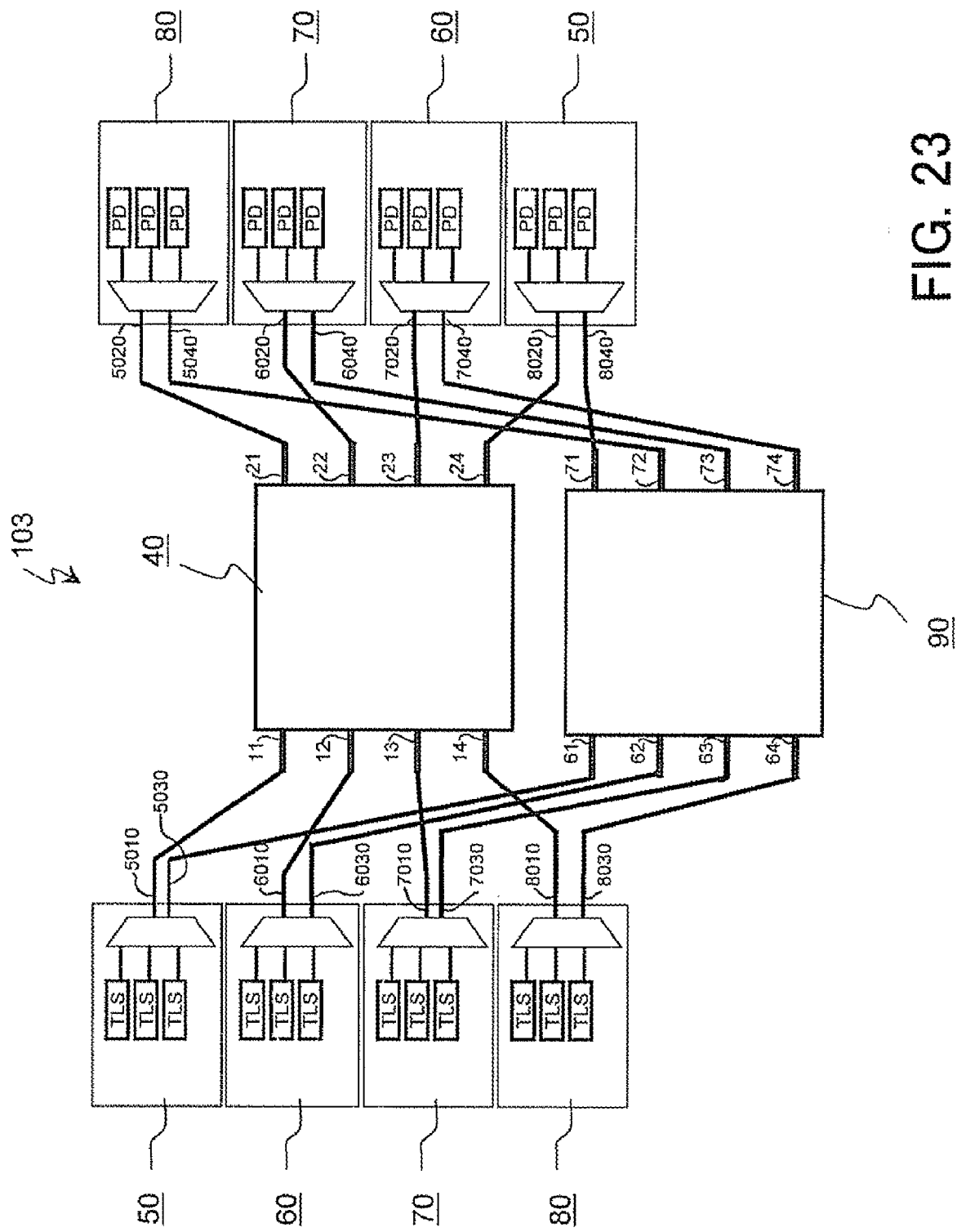
FIG. 23 is a configuration diagram of a system according to a third embodiment of the present invention.
Figure 24:
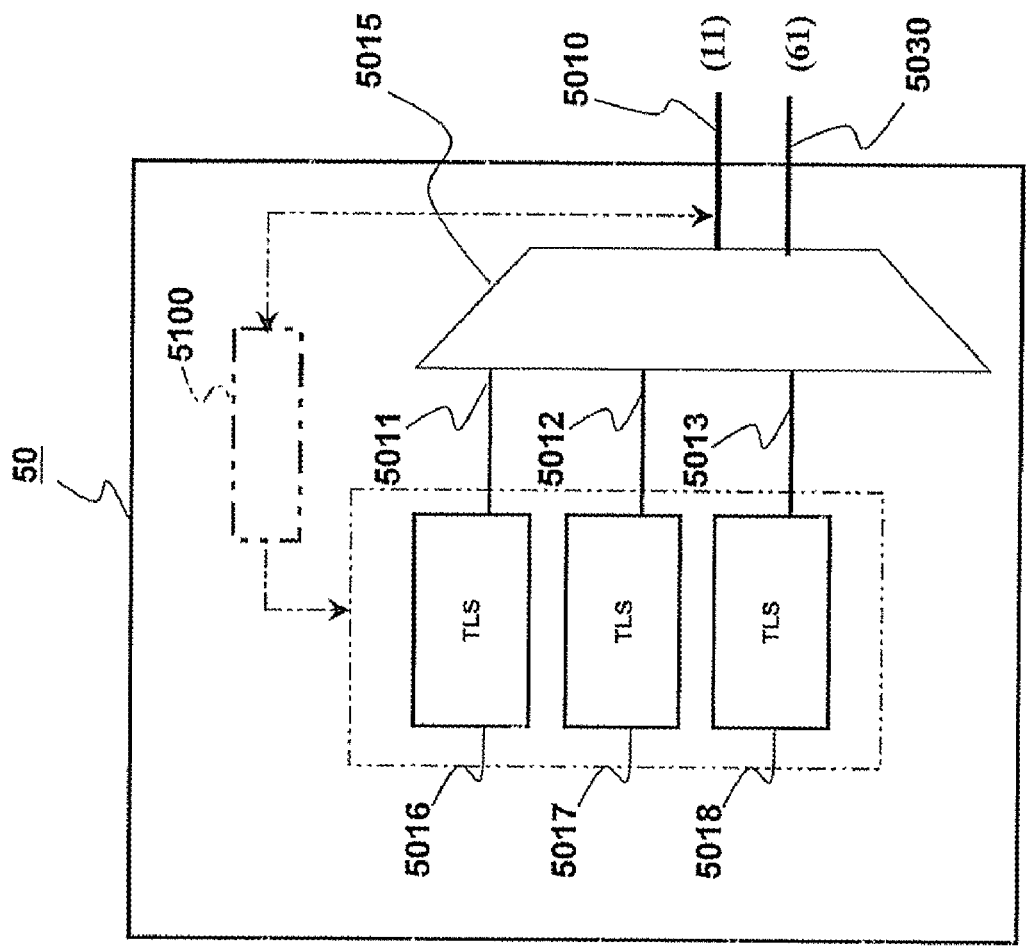
FIG. 24 is a configuration diagram of an optical transmitter of a node according to the third embodiment.

FIG. 23 shows a configuration of a system according to a third embodiment of the present invention. A system 103 according to this embodiment is configured to double connection paths among four nodes 50 to 80 so as to change over to preliminary connection paths if normal connection paths become unavailable. As shown in FIG. 23, the system 103 according to this embodiment includes not only a normal array waveguide grating 40 but also a preliminary array waveguide grating 90 having a routing property similarly to the normal array waveguide grating 40.

Output ports 5010, 6010, 7010 and 8010 of nodes 50 to 80 are connected to input ports 11 to 14 of the normal array waveguide grating 40, respectively. Input ports 5020, 6020, 7020 and 8020 of the nodes 50 to 80 are connected to output ports 21 to 24 of the array waveguide grating 40, respectively. Furthermore, different output ports 5030, 6030, 7030 and 8030 of the nodes 50 to 80 are connected to input ports 61 to 64 of the preliminary array waveguide grating 90, respectively. Input ports 5040, 6040, 7040 and 8040 of the nodes 50 to 80 are connected to output ports 71 to 74 of the preliminary array waveguide grating 90, respectively.

FIG. 14 shows a configuration of an optical transmitter of the node 50. In the optical transmitter, three tunable wavelength light sources 5016 to 5018 are installed so that lights output from the tunable wavelength light sources 5016 to 5018 are input to input ports 5011 to 5013 of a wavelength multiplexer 5015, respectively. An output port 5010 out of two output ports of the wavelength multiplexer 5015 is connected to the input port 11 of the normal array waveguide grating 40. The other output port 5030 is connected to the input port 61 of the preliminary array waveguide grating 90. The other nodes 60 to 80 are similarly configured to the node 50, and reference signs of constituent elements of the respective nodes 60, 70 and 80 are given so as to replace upper-two-figure numbers described above by 60, 70 and 80 according to their node numbers, respectively.

The optical transmitter also includes means 5100 for monitoring whether or not a connection failure occurs between the node 50 and the normal array waveguide grating 40 and for changing settings of wavelengths of tunable wavelength light sources when the failure occurs.

Figure 25:
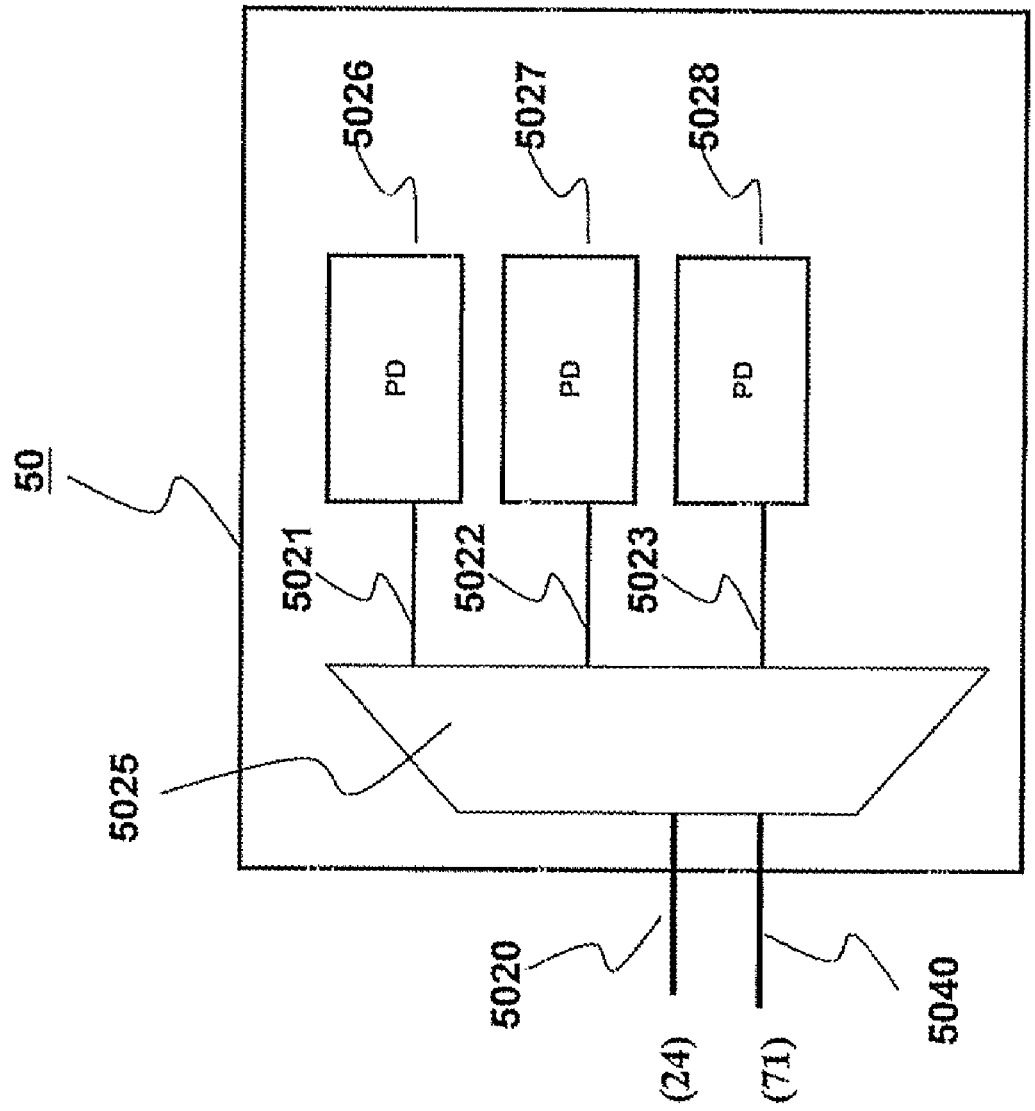
FIG. 25 is a configuration diagram of an optical receiver of the node according to the third embodiment.

FIG. 25 is a configuration diagram showing a configuration of an optical receiver of the node 50. In the optical receiver, three photodetectors 5026 to 5028 are installed so as to input outputs from output ports 5021 to 5023 of a wavelength demultiplexer 5025, respectively. An input port 5020 out of two input ports of the wavelength demultiplexer 5025 is connected to the output port 24 of the array waveguide grating 40. The other input port 5040 thereof is connected to the output port 71 of the preliminary array waveguide grating 90. The other nodes 60, 70 and 80 are configured similarly to the node 50, and reference signs of constituent elements of the respective nodes 60, 70 and 80 are given so as to replace upper-two-figure numbers described above by 60, 70 and 80 according to their node numbers, respectively.

In the system 103 according to this embodiment, a channel period of each of the two array waveguide grating 40 and 90 is set to "4", and a channel period of each of the wavelength multiplexers 5015, 6015, 7015 and 8015 of each node and a channel period of each of the wavelength demultiplexers 5025, 6025, 7025 and 8025 of each node are set to "3".

FIG. 26 shows combinations of wavelengths transmittable between input/output ports of the wavelength multiplexers 5015, 6015, 7015 and 8015. In a table shown in FIG. 26, horizontal rows correspond to the output ports 5010, 5030, 6010, 6030, 7010, 7030, 8010 and 8030 of the respective nodes 50, 60, 70 and 80 and vertical columns correspond to input port numbers of the wavelength multiplexers 5015, 6015, 7015 and 8015 included in the respective nodes. In case of the input port number "X11", for example, represents the input port 5011 for the node 50 and represents 8011 for the node 80.

The table of FIG. 26 will be described while referring to the node 50 by way of example. When the signals having the wavelengths of "1", "2" and "3" are input to the input ports 5011, 5012 and 5013, respectively, the wavelength multiplexer 5015 installed in the node 50 outputs those signals from the output port 5010 connected to the array waveguide grating 40. Further, when the signals having the wavelengths of "2", "3" and "1" are input to the input ports 5011, 5012 and 5013, respectively, the wavelength multiplexer 5015 outputs those signals from the other output port 5030 connected to the preliminary array waveguide grating 90.

FIG. 27 shows combinations of wavelengths transmittable between input/output ports of the array waveguide grating 40. Since a table shown in FIG. 27 is basically the same as that shown in FIG. 17 except for reference symbols of the respective nodes, it will not be described herein.

FIG. 28 shows combinations of wavelengths transmittable between input/output ports of the wavelength demultiplexers 5025, 6025, 7025 and 8025. This table corresponds to FIG. 26 and will not be described.

FIG. 29 shows combinations of wavelengths transmittable between input/output ports of the preliminary array waveguide grating 90. This table is the same as that of FIG. 27 relating to the array waveguide grating 40 in combinations of wavelengths. The table of FIG. 29 differs from that of FIG. 27 in that the output ports 71 to 74 of the array waveguide grating 90 are connected to the output ports 50, 80, 70 and 60 and numbers of the output nodes are off by one from those shown in FIG. 27, respectively.

Figure 30:
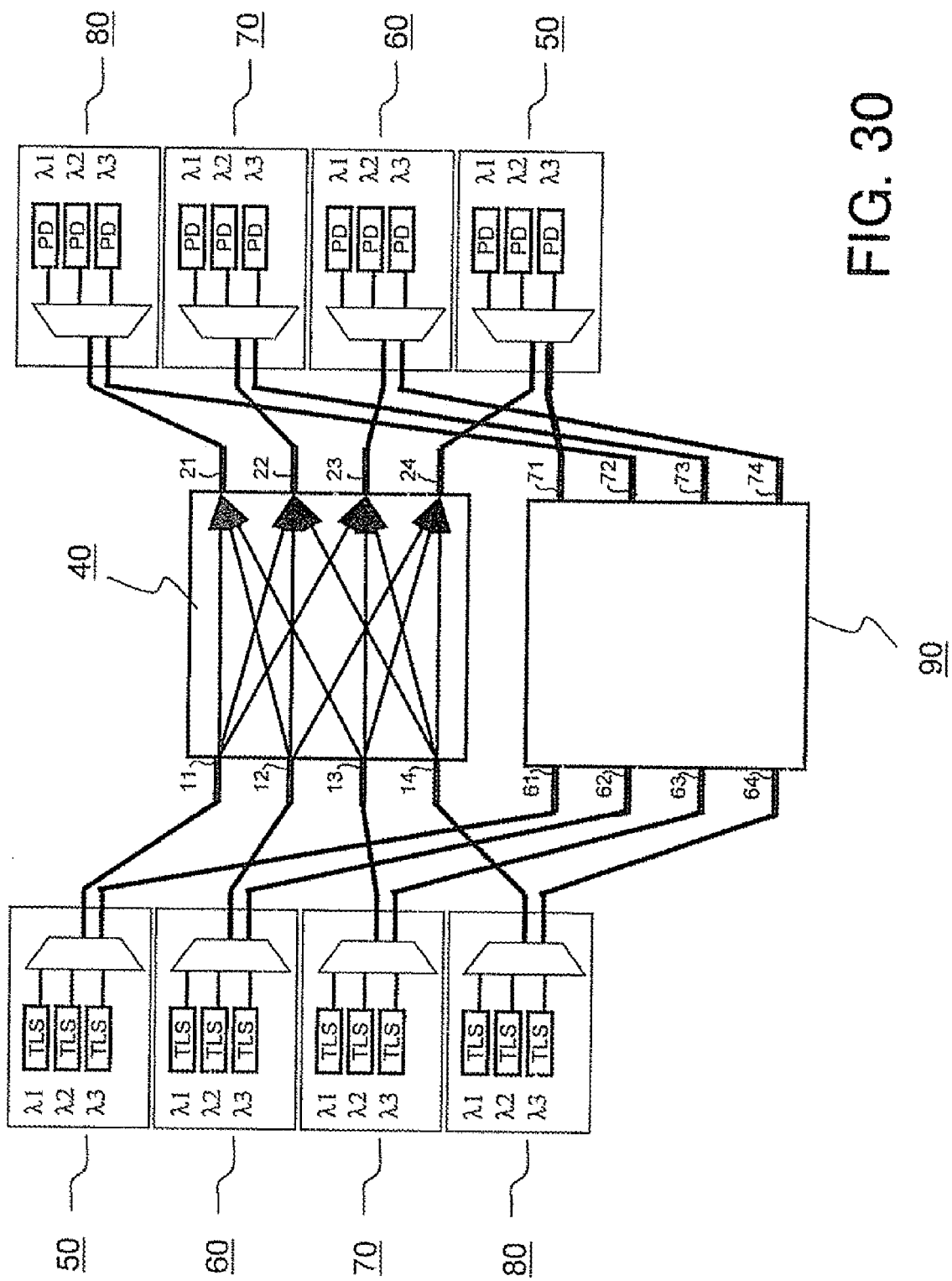
FIG. 30 is a pattern diagram of a partial full-mesh connection according to the third embodiment.

Operation according to this embodiment will be described. FIG. 30 typically shows operation performed if a partial full-mesh connection is realized based on the setting in tables of FIG. 26 to 29 in the system 103 shown in FIG. 23. A connection form shown is such that connection between different nodes is established by the full-mesh connection without establishing the connection between the same nodes.

Figure 31:
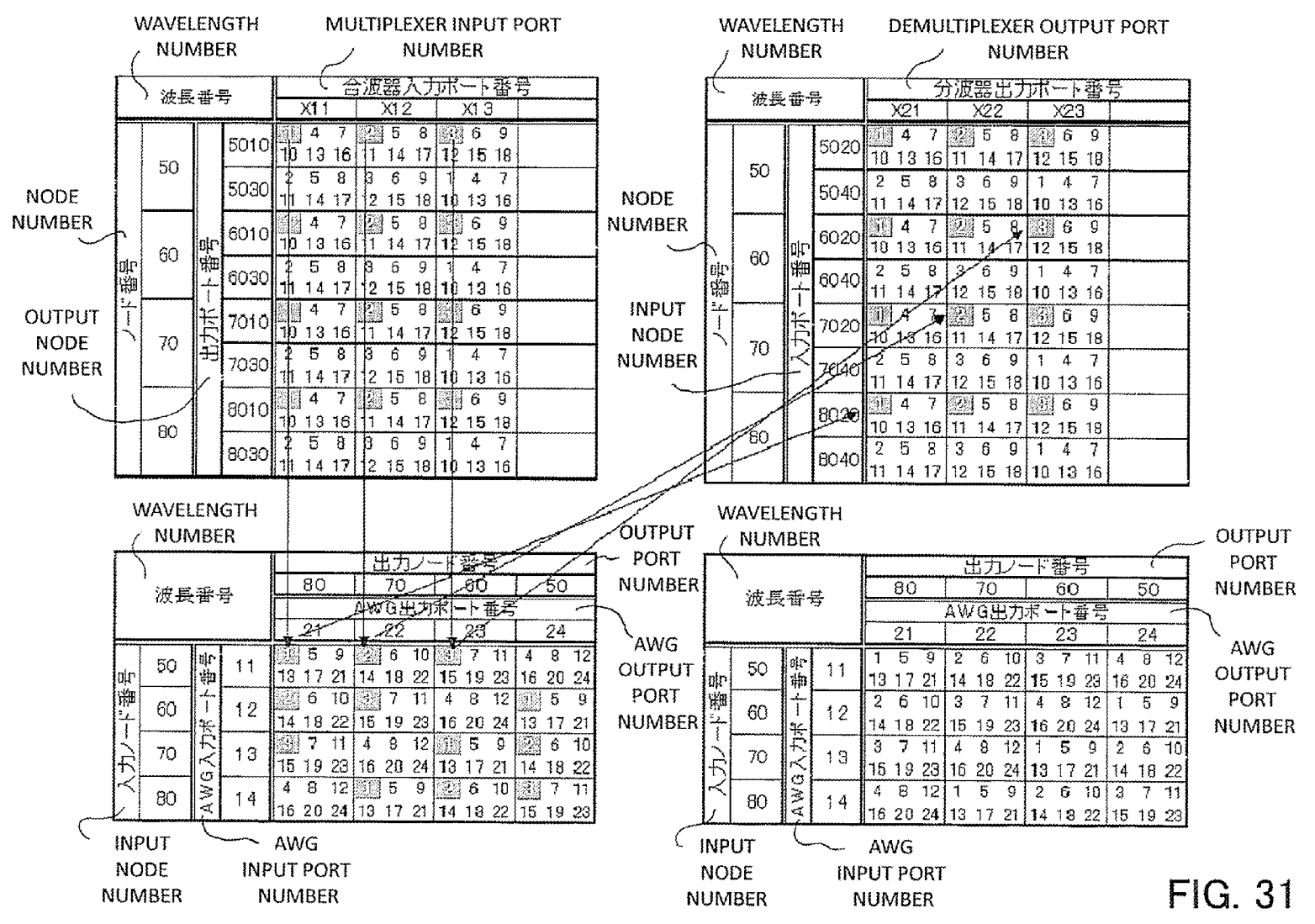

Moreover, FIG. 31 shows that the operation shown in FIG. 30 is mapped to the tables of FIGS. 26 to 29. Similarly to the above, only paths of optical signals from the node 50 are indicated by arrows. In case of the paths shown in FIG. 31, only the connection via the normal array waveguide grating 40 is established and the preliminary array waveguide grating 90 is not used. Therefore, the operation performed by the system 103 is similar to that according to the second embodiment described above along FIGS. 19 and 20 and will not be described in detail.

Figure 32:
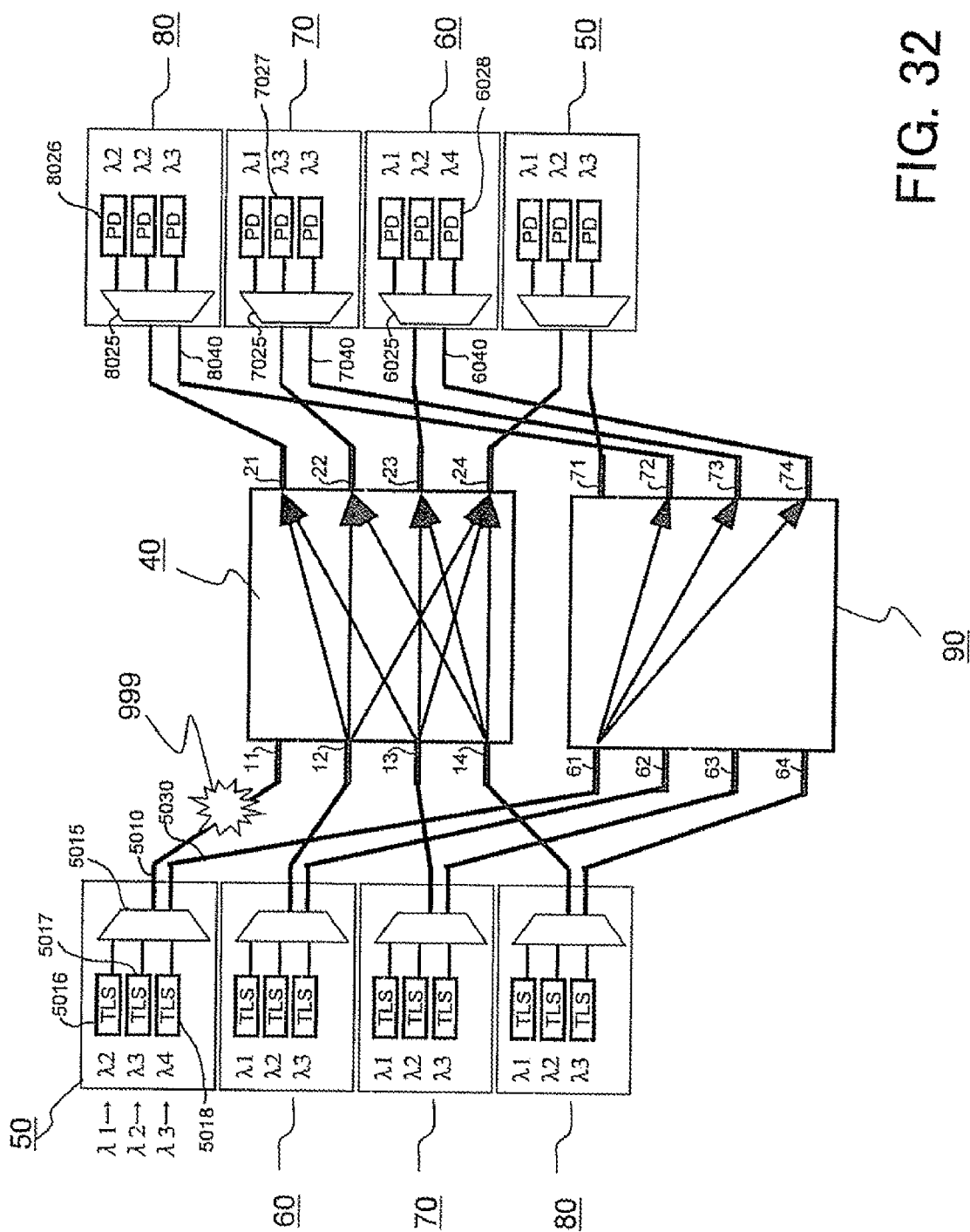
FIG. 32 is a pattern diagram of an instance in which a failure occurs during the partial full-mesh connection according to the third embodiment.

FIG. 32 typically shows operation if a failure 999 occurs to a connection path between the output port 5010 of the node 50 and the input port 11 of the array waveguide grating 40 while the system 103 is operating in the connection form shown in FIG. 30.

If the failure 999 occurs, the node 50 changes oscillation wavelengths of the tunable wavelength light sources 5016 to 5018 that output the optical signals having the wavelengths of λ1 to λ3 to λ2, λ3 and λ4, respectively. More specifically, the node 50 changes the oscillation wavelength of the tunable wavelength light source 5016 from λ1 to λ2, that of the tunable wavelength light source 5017 from λ2 to λ3 and that of the tunable wavelength light source 5018 from λ3 to λ4.

Before occurrence of the failure 999, the wavelength multiplexer 5015 outputs a multiplexed signal of λ1 to λ3 from the output port 5015. However, if the oscillation wavelengths are changed to λ2 to λ4 as a result of occurrence of the failure 999, the wavelength multiplexer 5015 outputs the multiplexed optical signal from the other output port 5030 in place of the output port 5010. The output multiplexed signal of λ2 to λ4 is input to the input port 61 of the preliminary array waveguide grating 90. As a consequence, an output path of the wavelength multiplexer 5015 is changed over from a normal output path to a preliminary output path.

When the multiplexed signal of λ2 to λ4 is input to the array waveguide grating 90 from the node 50, the array waveguide grating 90 outputs the optical signal having the wavelength of λ2 to the node 80 from the output port 72, the optical signal having the wavelength of λ3 to the node 70 from the output port 73, and the optical signal having the wavelength of λ4 to the node 60 from the output port 72.

The wavelength demultiplexer 8025 of the node 80 outputs the optical signal having the wavelength of λ2 and input from the preliminary input port 8040 to a photodetector 8026. The wavelength demultiplexer 7025 of the node 70 outputs the optical signal having the wavelength of λ3 and input from the preliminary input port 7040 to a photodetector 7027. The wavelength demultiplexer 6025 of the node 60 outputs the optical signal having the wavelength of λ4 and input from the preliminary input port 6040 to a photodetector 6028.

Figure 33:
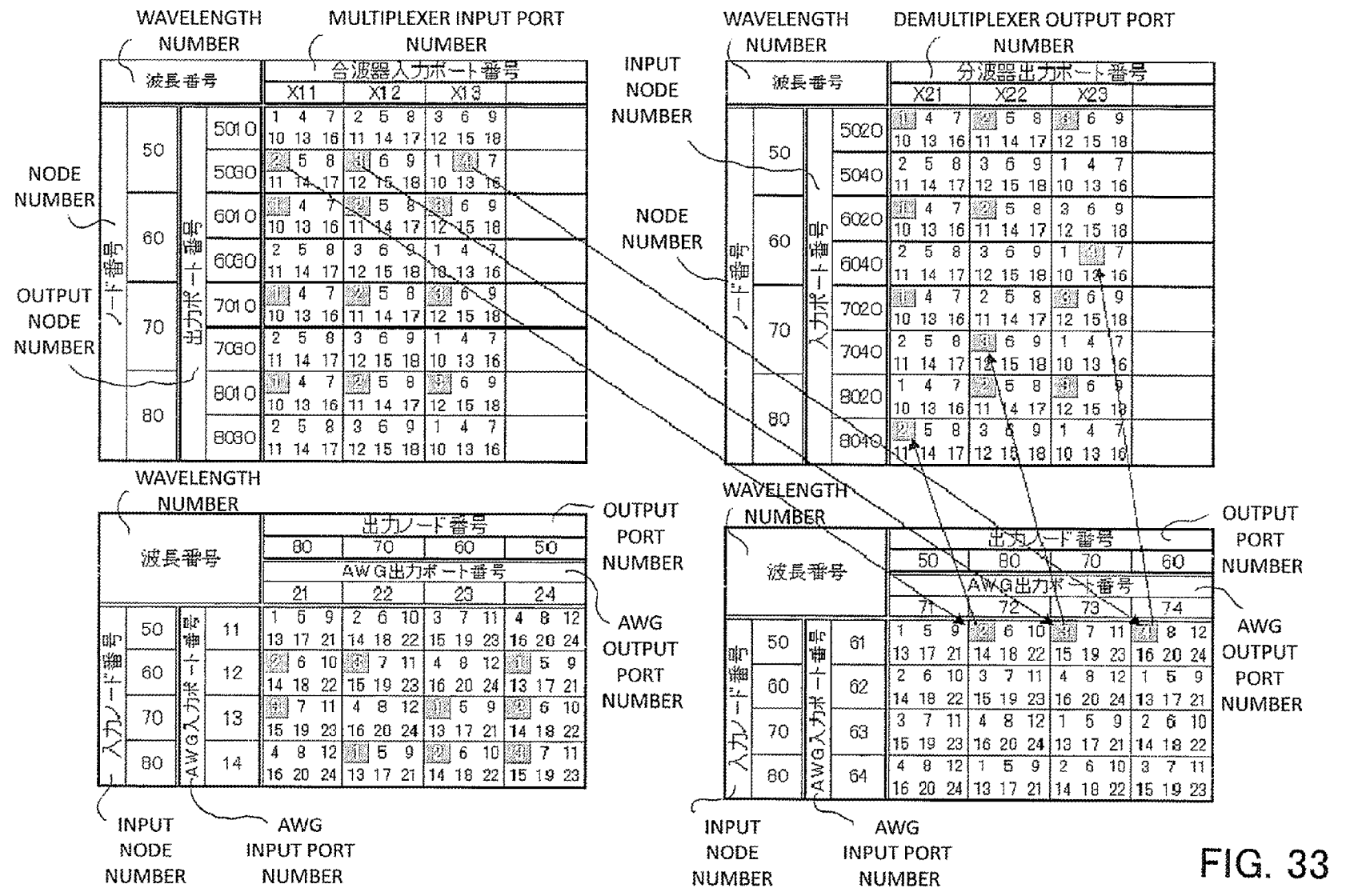

FIG. 33 shows that the operation during occurrence of the failure shown in FIG. 32 is mapped to the tables of FIGS. 26 to 29. As obvious from comparison of a table of FIG. 33 with the table of FIG. 31, an inter-node end-to-end connection relationship has no change even if the connection path is changed over to another for avoidance of the failure in the system 103. Moreover, since optical signals having a plurality of wavelengths are not input to one photodetector, crosstalk does not occur.

The description along FIGS. 32 and 33 given above relates to a case in which only one failure (999) occurs for brevity of description. However, even if a plurality of connection failures occurs simultaneously to the array waveguide grating 40, the failures can be avoided by a similar method. Furthermore, even if the connection form is another connection form other than the full-mesh connection among the different nodes as shown in FIG. 32, a failure or failures can be avoided by changing wavelengths of the tunable wavelength light sources.

The wavelength multiplexers 5015, 6015, 7015 and 8015 and the wavelength demultiplexers 5025, 6025, 7025 and 8025 installed in the respective nodes can be realized by an array waveguide grating having a periodic property or the like.

The system according to this embodiment is configured so that the connection path is doubled by setting each of the number of array waveguide gratings, the number of output ports of each of the wavelength multiplexers and the number of input ports of each of the wavelength demultiplexers to "2". Alternatively, the numbers may be more than or equal to "2". In that case, the connection path can be further multiplexed by additionally providing preliminary array waveguide gratings according to a connection form of the system configuration.

According to the third embodiment stated so far, even if a connection failure occurs between a node and the array waveguide grating, the inter-node connection can be continuously held by changing over to the preliminary array waveguide grating.

In the systems according to the respective embodiments, the number of nodes is "4". Alternatively, the number of nodes may be other than 4. In that case, the channel period of the array waveguide grating is set to "N" and the channel period "K" of each of the wavelength demultiplexers is set to a numeric value different from "N" for the number of nodes "N", thereby obtaining similar operation and effects to those according to the embodiments. Similarly to the above description, it is more desirable to set the difference between "N" and "K" to "1" so as to improve communication band utilization efficiency.

In the systems according to the respective embodiments, the wavelength multiplexer is installed in the optical transmitter of each of the nodes. Alternatively, an optical coupler may be used in place of the wavelength multiplexer. In this case, the optical coupler refers to a device splitting an input light or combining input lights irrespectively of wavelengths. However, if the optical coupler is used, theoretical branch loss disadvantageously occurs. Generally, a theoretical loss of about 3n (dB) occurs to an optical coupler the number of input ports of which is "2n" and the number of output ports of which is "1". Accordingly, if the number of input ports is greater, it is more advantageous to use the wavelength multiplexer rather than the optical coupler in view of loss.

Moreover, in the systems according to the respective embodiments, the light sources of the respective nodes are all the tunable wavelength light sources. Alternatively, similar operation and effects can be obtained even if tunable wavelength light sources are used for part of the light sources and fixed wavelength light sources are used for remainder thereof, depending on a degree of necessary connection change. In this case, it is advantageously possible to be able to reduce cost of the optical transmitters as compared with the instance of using the tunable wavelength light sources for all the light sources.

Furthermore, in the respective embodiments, the light sources are directly connected to the wavelength multiplexers. Alternatively, an optical modulator, an optical amplifier or the like may be arranged between the light sources and the wavelength multiplexer as need arises. Moreover, in the embodiments, the output ports of the wavelength demultiplexers are directly connected to the photodetectors, respectively. Alternatively, the output ports of the wavelength demultiplexers may be connected to the other devices such as optical amplifiers or optical dispersion compensators.

Further, in the embodiments, channels of the optical signals are arranged at equal wavelength intervals. Alternatively, the channels may be arranged at equal frequency intervals.

What is claimed:

1. A wavelength routing system comprising:
a plurality of nodes; and
an array waveguide grating having a routing property and optically connected to the plurality of nodes,
wherein:
each of the nodes has a plurality of light sources outputting lights at different wavelengths to the array waveguide grating, respectively; and
a wavelength demultiplexer having a periodic property, demultiplexing a light output from the array waveguide grating, and outputting the demultiplexed lights,
the plurality of light sources includes a tunable wavelength light source,
the wavelength demultiplexer is set a value as a channel period which is different from that of the array waveguide grating, and which is more than or equal to a number of output ports of the wavelength demultiplexer, and
the channel period of the wavelength demultiplexer and the channel period of the array waveguide grating are set to be relatively prime.

2. The wavelength routing system according to claim 1, wherein:
each of the nodes has a wavelength multiplexer having the periodic property, multiplexing lights from the plurality of light sources, and outputting the multiplexed light to the array waveguide grating, and
the wavelength multiplexer is set a value as a channel period which is different from that of the array waveguide grating, and which is more than or equal to a number of output ports of the wavelength multiplexer.

3. The wavelength routing system according to claim 2, wherein the channel period of the wavelength demultiplexer and the channel period of the wavelength multiplexer are set to be equal values.

4. The wavelength routing system according to claim 1, wherein a number of the plurality of light sources is more than or equal to a number obtained by subtracting 1 from a number of the plurality of nodes.

5. The wavelength routing system according to claim 1, further comprising a second array waveguide grating having the routing property and optically connected to the plurality of nodes, wherein each of the nodes has means for monitoring a communication failure between the plurality of light sources and the array waveguide grating, changing the wavelengths of the lights to be output from the plurality of light sources, and outputting the lights at the changed wavelengths to the second array waveguide grating, when detecting the communication failure.

6. A wavelength routing system comprising:
a plurality of nodes; and
an array waveguide grating having a routing property and optically connected to the plurality of nodes, wherein:
each of the nodes has a plurality of light sources outputting lights at different wavelengths to the array waveguide grating, respectively; and a wavelength demultiplexer having a periodic property, demultiplexing a light output from the array waveguide grating, and outputting the demultiplexed lights,
the plurality of light sources includes a tunable wavelength light source,
the wavelength demultiplexer is set a value as a channel period which is different from that of the array waveguide grating, and which is more than or equal to a number of output ports of the wavelength demultiplexer, and
a difference between the channel period of the wavelength demultiplexer and the channel period of the array waveguide grating is set to 1.

7. A wavelength routing system comprising:
a plurality of nodes; and
an array waveguide grating having a routing property and optically connected to the plurality of nodes, wherein:
each of the nodes has a plurality of light sources outputting lights at different wavelengths to the array waveguide grating, respectively; and
a wavelength demultiplexer having a periodic property, demultiplexing a light output from the array waveguide grating, and outputting the demultiplexed lights,
the plurality of light sources includes a tunable wavelength light source,
the wavelength demultiplexer is set a value as a channel period which is different from that of the array waveguide grating, and which is more than or equal to a number of output ports of the wavelength demultiplexer,
each of the nodes has a wavelength multiplexer having the periodic property, multiplexing lights from the plurality of light sources, and outputting the multiplexed light to the array waveguide grating,
the wavelength multiplexer is set a value as a channel period which is different from that of the array waveguide grating, and which is more than or equal to a number of output ports of the wavelength multiplexer, and
the channel period of the wavelength multiplexer and the channel period of the array waveguide grating are set to be relatively prime.

8. A wavelength routing system comprising:
a plurality of nodes; and
an array waveguide grating having a routing property and optically connected to the plurality of nodes, wherein:
each of the nodes has a plurality of light sources outputting lights at different wavelengths to the array waveguide grating, respectively; and
a wavelength demultiplexer having a periodic property, demultiplexing a light output from the array waveguide grating, and outputting the demultiplexed lights,
the plurality of light sources includes a tunable wavelength light source,
the wavelength demultiplexer is set a value as a channel period which is different from that of the array waveguide grating, and which is more than or equal to a number of output ports of the wavelength demultiplexer, each of the nodes has a wavelength multiplexer having the periodic property, multiplexing lights from the plurality of light sources, and outputting the multiplexed light to the array waveguide grating, the wavelength multiplexer is set a value as a channel period which is different from that of the array waveguide grating, and which is more than or equal to a number of output ports of the wavelength multiplexer, and a difference between the channel period of the wavelength multiplexer and the channel period of the array waveguide grating is set to 1.

9. A node optically connected to an array waveguide grating having a routing property, comprising:

a plurality of light sources outputting lights at different wavelengths to the array waveguide grating, respectively; and a wavelength demultiplexer having a periodic property, demultiplexing a light output from the array waveguide grating, and outputting the demultiplexed lights, wherein:

the plurality of light sources includes a tunable wavelength light source, the wavelength demultiplexer is set a value as a channel period which is different from that of the array waveguide grating, and which is more than or equal to a number of output ports of the wavelength demultiplexer, and the channel period of the wavelength demultiplexer and the channel period of the array waveguide grating are set to be relatively prime.

10. The node according to claim 9, further comprising a wavelength multiplexer having the periodic property, multiplexing lights from the plurality of light sources, and outputting a multiplexed light to the array waveguide grating, wherein the wavelength multiplexer is set a value as a channel period which is different from that of the array waveguide grating, and which is more than or equal to a number of output ports of the wavelength multiplexer.

11. The node according to claim 10, wherein the channel period of the wavelength demultiplexer and the channel period of the wavelength multiplexer are set to be equal values.

12. A node optically connected to an array waveguide grating having a routing property, comprising:

a plurality of light sources outputting lights at different wavelengths to the array waveguide grating, respectively; and a wavelength demultiplexer having a periodic property, demultiplexing a light output from the array waveguide grating, and outputting the demultiplexed lights, wherein:

the plurality of light sources includes a tunable wavelength light source, the wavelength demultiplexer is set a value as a channel period which is different from that of the array waveguide grating, and which is more than or equal to a number of output ports of the wavelength demultiplexer, and a difference between the channel period of the wavelength demultiplexer and the channel period of the array waveguide grating is set to 1.

13. A node optically connected to an array waveguide grating having a routing property, comprising:

a plurality of light sources outputting lights at different wavelengths to the array waveguide grating, respectively;

a wavelength demultiplexer having a periodic property, demultiplexing a light output from the array waveguide grating, and outputting the demultiplexed lights; and a wavelength multiplexer having the periodic property, multiplexing lights from the plurality of light sources, and outputting a multiplexed light to the array waveguide grating, wherein:

the plurality of light sources includes a tunable wavelength light source, the wavelength demultiplexer is set a value as a channel period which is different from that of the array waveguide grating, and which is more than or equal to a number of output ports of the wavelength demultiplexer, the wavelength multiplexer is set a value as a channel period which is different from that of the array waveguide grating, and which is more than or equal to a number of output ports of the wavelength multiplexer, and the channel period of the wavelength multiplexer and the channel period of the array waveguide grating are set to be relatively prime.

14. A node optically connected to an array waveguide grating having a routing property, comprising:

a plurality of light sources outputting lights at different wavelengths to the array waveguide grating, respectively;

a wavelength demultiplexer having a periodic property, demultiplexing a light output from the array waveguide grating, and outputting the demultiplexed lights; and a wavelength multiplexer having the periodic property, multiplexing lights from the plurality of light sources, and outputting a multiplexed light to the array waveguide grating, wherein:

the plurality of light sources includes a tunable wavelength light source, the wavelength demultiplexer is set a value as a channel period which is different from that of the array waveguide grating, and which is more than or equal to a number of output ports of the wavelength demultiplexer, the wavelength multiplexer is set a value as a channel period which is different from that of the array waveguide grating, and which is more than or equal to a number of output ports of the wavelength multiplexer, and a difference between the channel period of the wavelength multiplexer and the channel period of the array waveguide grating is set to 1.

* * * * *